US007685036B1

(12) United States Patent
Hsu et al.

(10) Patent No.: US 7,685,036 B1
(45) Date of Patent: Mar. 23, 2010

(54) SYSTEM AND METHOD FOR DELIVERING A FINANCIAL MESSAGE

(75) Inventors: Phillip Koh-Kwe Hsu, River Edge, NJ (US); Susan M. Carlos, Scotch Plains, NJ (US)

(73) Assignee: UBS Financial Services, Inc., Weehawken, NJ (US)

(*) Notice: Subject to any disclaimer, the term of this patent is extended or adjusted under 35 U.S.C. 154(b) by 1339 days.

(21) Appl. No.: 09/687,892

(22) Filed: Oct. 13, 2000

(51) Int. Cl.
*G06Q 40/00* (2006.01)

(52) U.S. Cl. ...................................................... 705/35

(58) Field of Classification Search .................. 705/1, 705/35–45; 709/201, 204, 227, 223; 706/45; 379/219, 67.1; 707/1; 715/500, 700; 719/313, 719/328; 370/351
See application file for complete search history.

(56) References Cited

U.S. PATENT DOCUMENTS

| | | | | | |
|---|---|---|---|---|---|
| 4,554,418 | A | * | 11/1985 | Toy | 379/88.01 |
| 4,727,243 | A | * | 2/1988 | Savar | 705/17 |
| 5,220,500 | A | * | 6/1993 | Baird et al. | 705/36 R |
| 5,608,786 | A | | 3/1997 | Gordon | 379/100 |
| 5,708,422 | A | | 1/1998 | Blonder et al. | 340/825 |
| 5,745,692 | A | | 4/1998 | Lohmann, II et al. | 395/200 |
| 5,754,111 | A | | 5/1998 | Garcia | 340/573 |
| 5,758,088 | A | * | 5/1998 | Bezaire et al. | 709/232 |
| 5,790,790 | A | | 8/1998 | Smith et al. | 395/200 |
| 5,819,263 | A | * | 10/1998 | Bromley et al. | 707/3 |
| 5,848,161 | A | | 12/1998 | Luneau et al. | 380/49 |
| 5,864,827 | A | | 1/1999 | Wilson | 705/35 |
| 5,864,828 | A | * | 1/1999 | Atkins | 705/36 R |
| 5,870,717 | A | | 2/1999 | Wiecha | 705/26 |
| 5,872,921 | A | | 2/1999 | Zahariev et al. | 395/200 |
| 5,893,091 | A | | 4/1999 | Hunt et al. | 707/3 |
| 5,920,848 | A | * | 7/1999 | Schutzer et al. | 705/42 |
| 5,926,801 | A | | 7/1999 | Matsubara et al. | 705/37 |
| 5,963,925 | A | * | 10/1999 | Kolling et al. | 705/40 |
| 5,991,735 | A | | 11/1999 | Gerace | 705/10 |
| 6,021,397 | A | | 2/2000 | Jones et al. | 705/36 |
| 6,021,433 | A | | 2/2000 | Payne et al. | 709/219 |
| 6,023,700 | A | | 2/2000 | Owens et al. | 707/10 |
| 6,029,146 | A | | 2/2000 | Hawkins et al. | 705/35 |
| 6,047,264 | A | | 4/2000 | Fisher et al. | 705/26 |
| 6,049,291 | A | | 4/2000 | Kikinis | 340/825 |
| 6,088,717 | A | * | 7/2000 | Reed et al. | 709/201 |
| 6,122,632 | A | * | 9/2000 | Botts et al. | 707/10 |
| 6,154,732 | A | * | 11/2000 | Tarbox | 705/36 R |
| 6,301,480 | B1 | * | 10/2001 | Kennedy et al. | 455/445 |
| 6,315,196 | B1 | * | 11/2001 | Bachman | 235/380 |
| 6,347,307 | B1 | * | 2/2002 | Sandhu et al. | 705/36 R |
| 6,377,993 | B1 | * | 4/2002 | Brandt et al. | 709/227 |
| 6,463,461 | B1 | * | 10/2002 | Hanson et al. | 709/204 |
| 6,505,233 | B1 | * | 1/2003 | Hanson et al. | 709/204 |

(Continued)

FOREIGN PATENT DOCUMENTS

WO    WO 00/23924    4/2000

*Primary Examiner*—Jagdish N Patel
*Assistant Examiner*—Sara Chandler
(74) *Attorney, Agent, or Firm*—Proskauer Rose LLP

(57) ABSTRACT

Systems and a method for delivering a financial message. The system for delivering a financial message includes, inter alia, an intervention system configured to allow an internal user of the system to add or edit content of a message to a client user prior to delivery. Advantageously, financial advisors and other internal users have the ability to interact with a client user to provide proactive financial advice.

15 Claims, 40 Drawing Sheets

U.S. PATENT DOCUMENTS

| | | | |
|---|---|---|---|
| 6,571,275 B1 * | 5/2003 | Dong et al. | 709/209 |
| 6,654,725 B1 * | 11/2003 | Langheinrich et al. | 705/14 |
| 6,684,249 B1 * | 1/2004 | Frerichs et al. | 709/225 |
| 6,691,153 B1 * | 2/2004 | Hanson et al. | 709/204 |
| 6,970,843 B1 * | 11/2005 | Forte | 705/39 |
| 7,089,202 B1 * | 8/2006 | McNamar et al. | 705/35 |
| 7,110,981 B1 * | 9/2006 | Sidikman et al. | 705/43 |
| 7,149,713 B2 * | 12/2006 | Bove et al. | 705/36 R |
| 7,165,044 B1 * | 1/2007 | Chaffee | 705/37 |
| 7,177,831 B1 * | 2/2007 | O'Shaughnessy et al. | 705/36 R |
| 7,197,484 B1 * | 3/2007 | Yuyama | 705/50 |
| 7,337,127 B1 * | 2/2008 | Smith et al. | 705/14 |
| 2005/0154658 A1 * | 7/2005 | Bove et al. | 705/35 |

* cited by examiner

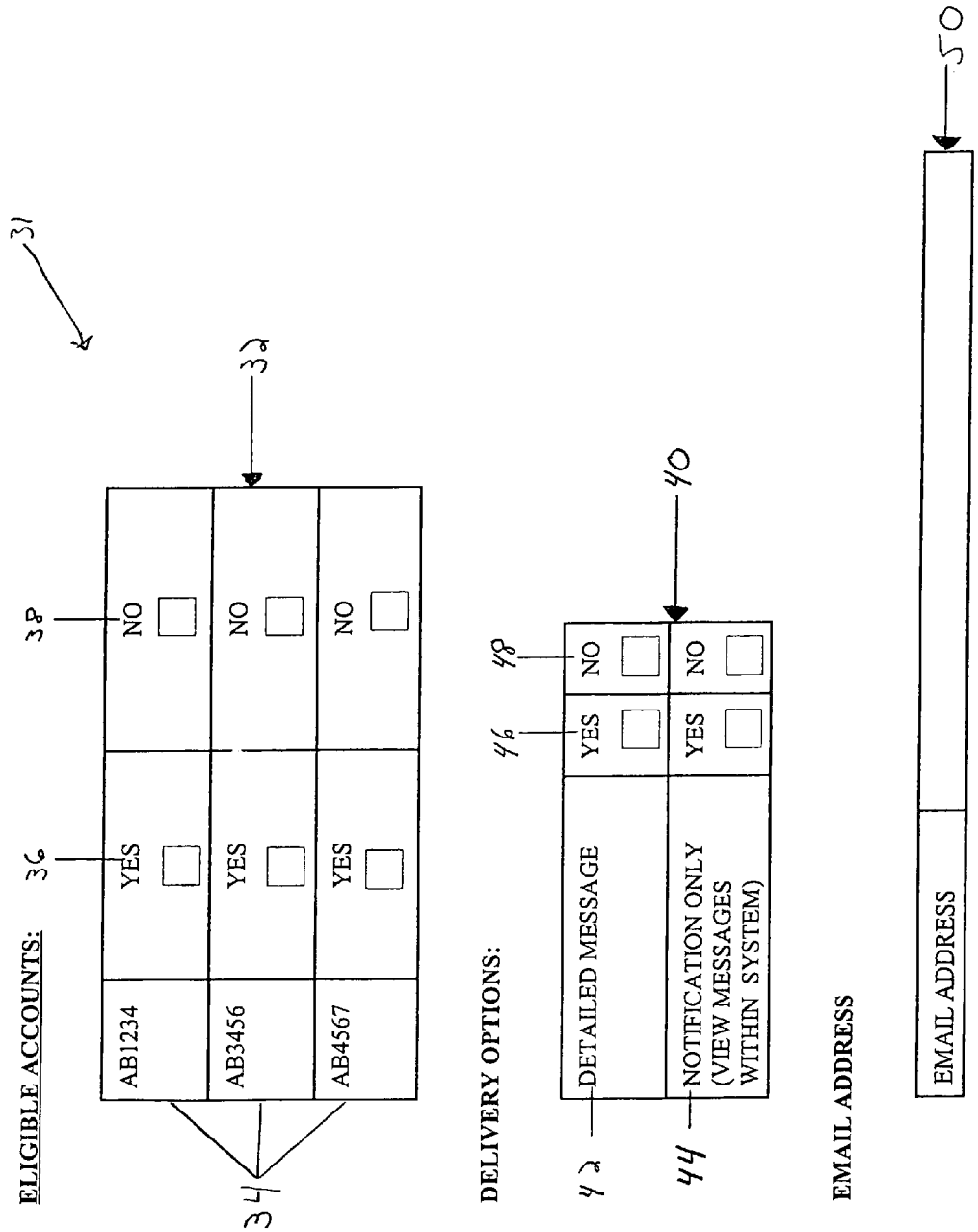

Messages:

| | | Yes 68 | No 52 70 |
|---|---|---|---|
| 1) | On-line Trading Order Status<br>(Any status change to your on-line orders)<br>54 | ☐ | ☐ |
| 2) | Research Reevaluation<br>(Any securities in your portfolio that have received new ratings from the PaineWebber's Equity Research Department)<br>56 | ☐ | ☐ |
| 3) | Expiring Options<br>(Any options in your portfolio due to expire)<br>58 | ☐ | ☐ |
| 4) | Maturing Bonds<br>(Any bonds in your portfolio due to mature)<br>60 | ☐ | ☐ |
| 5) | Called Bonds<br>(Any bonds subject to a full or partial call)<br>62 | ☐ | ☐ |
| 6) | Research—Highlighted Stocks List<br>PaineWebber's *Highlighted Stocks* list presents investors with a choice group of companies from the core investment themes that our Strategy Group identifies. Subscribe here for monthly updates that include core investment themes, the stocks that fit those themes and performance of the List versus the S&P 500.<br>64 | ☐ | ☐ |
| 7) | Research—Focus List Recap<br>The Focus List is a list of up to 30 stocks, all rated "Buy" or "Attractive", that are selected by a committee of investment professionals. The Focus List employs a proprietary stop-loss mechanism designed to minimize risk. Subscribe here for updates after the committee's weekly meetings.<br>66 | ☐ | ☐ |

Add Product Touchpoint to E-lerts

Step 1: Search for E-lert(s) to touchpoint

| E-lert Category | E-lert Type Template | Broker Name | FA ID Number | Wire Code |
|---|---|---|---|---|
| Portfolio Related | Expiring Options | | | |

Search

Step 2: Choose which future E-lert(s) to personalize with a touchpoint

E-lert Count: 2

| E-lert Category | E-lert Type Template | Broker Name | FA ID Number | Wire Code | Select? |
|---|---|---|---|---|---|
| Portfolio Related | Expiring Options | Phil Hsu | | | ✓ |
| Portfolio Related | Closing Balance | Jim Schmitz | | | ☐ |

Select All   Unselect All

Step 3: Create touchpoint

Create Touchpoint

FIG. 25

Additional Features 460

Online Chat System 462

Video Conferencing System 464

Webcasting System 466

FIG. 29

E-LERT TYPE: TRADE ACTIVITY —— 73

FROM: ELECTRONIC MESSAGING SYSTEM
SUBJECT: MESSAGE ABOUT YOUR PORTFOLIO

THE FOLLOWING E-LERT(S) ARE NOW AVAILABLE IN YOUR INBOX: —— 74

ORDER STATUS - OPEN —— 76

TO ACCESS YOUR MESSAGE(S), CLICK ON THE LINK BELOW TO LOG ON. THEN CLICK THE E-LERT TAB.

HTTP://WWW.XYZ.ABZ —— 78

NOTE: THIS IS NOT A LEGAL CONFIRMATION OF YOUR ORDER. INSTEAD IT IS A COMPLETE RECAP OF YOUR ORDER. UPON EXECUTION, AN ACTUAL TRADE CONFIRMATION WILL BE MAILED TO YOU. YOU CAN ALSO CONFIRM THE EXECUTION OF YOUR ORDER BY YOUR FINANCIAL ADVISOR, OR BY REFERRING TO THE TRANSACTION DETAIL SCREEN. —— 80

FIG. 30

| ALERTS | MESSAGE SUMMARY | IN-BOX MESSAGE TEXT |
|---|---|---|
| RESEARCH REEVALUATION | RESEARCH REEVALUATION | THE FOLLOWING SECURITIES IN YOUR PORTFOLIO HAVE RECEIVED NEW RATINGS FROM THE INTERNAL RESEARCH DEPARTMENT. <br><br> SEE ATTACHMENT A FOR FULL MESSAGE TEXT. |
| EXPIRING OPTIONS | OPTIONS EXPIRING | THE FOLLOWING OPTIONS IN YOUR PORTFOLIO WILL BE EXPIRING IN THE NEXT 2 WEEKS. <br><br> SEE ATTACHMENT B FOR FULL MESSAGE TEXT |
| MATURING SECURITIES | MATURING BONDS | THE FOLLOWING BONDS IN YOUR PORTFOLIO WILL BE MATURING IN THE NEXT 2 WEEKS. <br><br> SEE ATTACHMENT C FOR FULL MESSAGE TEXT |
| CALLED BONDS | CALLED BONDS | THE FOLLOWING BONDS IN YOUR PORTFOLIO ARE SCHEDULED TO BE CALLED IN THE NEXT 2 WEEKS. <br><br> SEE ATTACHMENT D FOR FULL MESSAGE TEXT |
| TRADING ALERTS | ORDER STATUS (SUBJECT TO COMPLIANCE APPROVAL) | SEE ATTACHMENT E FOR FULL MESSAGE TEXT |

FIG. 33

TYPE: RESEARCH REEVALUATION

RESEARCH REEVALUATION - THE FOLLOWING SECURITY(S) IN YOUR PORTFOLIO HAVE RECEIVED NEW RATINGS FROM THE INTERNAL RESEARCH DEPARTMENT:

| A/C# | ACTION | SYMBOL | SECURITY DESCR. | QTY. | CLOSING PRICE | CLOSING MKT. VALUE | NEW RATING | OLD RATING | DATE |
|------|--------|--------|-----------------|------|---------------|---------------------|------------|------------|------|
| XXX | DOWN | DOW | DOW CHEM. | 1,196L | 114 3/4 | $137,241 | NEUTRAL | ATTRACT | 1/1/00 |

PLEASE CONTACT YOUR FINANCIAL ADVISOR IF YOU HAVE ANY QUESTIONS OR WOULD LIKE TO DISCUSS THIS MATERIAL

THE INFORMATION ABOVE IS BELIEVED TO BE RELIABLE, BUT ITS ACCURACY CANNOT BE GUARANTEED THIS COMPANY, ITS AFFILIATED COMPANIES, AND/OR THEIR OFFICERS, DIRECTORS, EMPLOYEES OR STOCKHOLDERS MAY AT TIMES HAVE A POSITION, INCLUDING AN ARBITRAGE POSITION, IN THE SECURITIES DESCRIBED HEREIN AND MAY SELL OR BUY THEM TO OR FROM THEIR CUSTOMERS. THESE COMPANIES MAY FROM TIME TO TIME ACT AS A CONSULTANT TO A COMPANY BEING REPORTED UPON.

FIG. 34

TYPE: EXPIRING OPTIONS

EXPIRING OPTIONS - THE FOLLOWING OPTIONS IN YOUR PORTFOLIO WILL BE EXPIRING IN THE NEXT TWO WEEKS:

| A/C# | SYMBOL | QTY. | SECURITY DESCR. | EXPIR. DATE | STRIKE PRICE | CLOSING PRICE OPTION | CLOSING STOCK | CLOSING MKT. VALUE |
|------|--------|------|-----------------|-------------|--------------|----------------------|---------------|---------------------|
| XXX | CIK | -16 5/4 | CALL CITI | 1/1/00 | 55 | 6 1/4 | 44 | -100 |

FIG. 35

TYPE: CALLED BONDS

CALLED BONDS - THE FOLLOWING BONDS IN YOUR PORTFOLIO ARE SCHEDULED TO BE CALLED IN THE NEXT TWO WEEKS:

| A/C# | SECUR. | QTY. | SECURITY DESCR. | S&P RATE | INT. RATE | MATURING DATE | CALL DATE | CALL PRICE | QTY. CALLED | CALLED BOND VAL. |
|---|---|---|---|---|---|---|---|---|---|---|
| XXX | B44YY6 | 10L | NJ HEALTH | AAA | 6.750 | 1/1/01 | 1/1/00 | 1020.00 | 10L | $10,200 |

FIG. 36

TYPE: MATURING SECURITIES

MATURING SECURITIES - THE FOLLOWING BONDS IN YOUR PORTFOLIO WILL BE MATURING IN THE NEXT TWO WEEKS:

| A/C# | SECUR. | QTY. | SECURITY DESCR. | S&P RATE | INT. RATE | MATURING DATE | MATURING VALUE |
|---|---|---|---|---|---|---|---|
| XXX | E37KV0 | 5L | TEMPE | AAA | 4.750 | 1/1/01 | $5000 |

FIG. 37

TYPE: ORDER STATUS

ORDER STATUS - OPEN

AN ORDER TO SELL 500 AOL AT MKT IN ACCOUNT AB 22343 HAS BEEN PLACED. ORDER NUMBER AB 1000

THIS IS NOT A LEGAL CONFIRMATION OF YOUR ORDER. INSTEAD IT IS A COMPLETE RECAP OF YOUR ORDER. UPON EXECUTION, AN ACTUAL TRADE CONFIRMATION WILL BE MAILED TO YOU. YOU CAN ALSO CONFIRM THE EXECUTION OF YOUR ORDER BY YOUR FINANCIAL ADVISOR, OR BY REFERRING TO THE TRANSACTION DETAIL SCREEN.

FIG. 38

| DESCRIPTION | DEFINITION | DELIVERY | SUMMARY | MESSAGE TO CLIENT |
| --- | --- | --- | --- | --- |
| | | | | MESSAGE |
| OPEN | A BUY OR SELL THAT HAS NOT BEEN EXECUTED. | IMMEDIATE | ORDER STATUS - OPEN | AN ORDER TO SELL 500 AOL AT MKT DAY IN ACCOUNT AB 22343 HAS BEEN PLACED. ORDER NUMBER AB 1000.<br><br>THIS IS NOT A LEGAL CONFIRMATION OF YOUR ORDER. INSTEAD IT IS A COMPLETE RECAP OF YOUR ORDER. UPON EXECUTION, AN ACTUAL TRADE CONFIRMATION WILL BE MAILED TO YOU. YOU CAN ALSO CONFIRM THE EXECUTION OF YOUR ORDER BY YOUR FINANCIAL ADVISOR, OR BY REFERRING TO THE TRANSACTION DETAIL SCREEN. |
| EXECUTED | EXECUTION MEANS THAT AN ORDER HAS BEEN FILLED (CARRIED OUT). | IMMEDIATE | ORDER STATUS - EXECUTED | YOUR ORDER TO SELL 500 AOL AT MKT IN ACCOUNT AB 22343 HAS BEEN EXECUTED AT AN AVERAGE PRICE OF 98 3/16. THE ESTIMATED TOTAL COST OF THE TRADE IS $49093.75. ORDER NUMBER AB 1000.<br><br>THIS IS NOT A LEGAL CONFIRMATION OF YOUR ORDER. INSTEAD IT IS A COMPLETE RECAP OF YOUR ORDER. UPON EXECUTION, AN ACTUAL TRADE CONFIRMATION WILL BE MAILED TO YOU. YOU CAN ALSO CONFIRM THE EXECUTION OF YOUR ORDER BY YOUR FINANCIAL ADVISOR, OR BY REFERRING TO THE TRANSACTION DETAIL SCREEN. |

FIG. 39

| DESCRIPTION | DEFINITION | DELIVERY | MESSAGE TO CLIENT | |
|---|---|---|---|---|
| | | | SUMMARY | MESSAGE |
| PARTIALLY EXECUTED | PART OF AN ORDER HAS BEEN FILLED AND THE REMAINING QUANTITY IS STILL IN FORCE (OPEN) AN AWAITING EXECUTION. | IMMEDIATE | ORDER STATUS - PARTIAL EXECUTION | YOUR ORDER TO BUY 100C AT 46 5/8 IN ACCOUNT AB 22343 HAS BEEN PARTIALLY EXECUTED. 400 C EXECUTED AT 46 1/2. THE ESTIMATED COST OF THE TRADE IS $18600.00. ORDER NUMBER AB 1001.<br><br>THIS IS NOT A LEGAL CONFIRMATION OF YOUR ORDER. INSTEAD IT IS A COMPLETE RECAP OF YOUR ORDER. UPON EXECUTION, AN ACTUAL TRADE CONFIRMATION WILL BE MAILED TO YOU. YOU CAN ALSO CONFIRM THE EXECUTION OF YOUR ORDER BY YOUR FINANCIAL ADVISOR, OR BY REFERRING TO THE TRANSACTION DETAIL SCREEN. |
| CANCELLED | VOID AN ORDER TO BUY OR SELL. | IMMEDIATE | ORDER STATUS - CANCELED | YOUR ORDER TO BUY 600 C AT 46 5/8 LMT IN ACCOUNT AB 22343 HAS BEEN CANCELLED. ORDER NUMBER AB 1001.<br><br>THIS IS NOT A LEGAL CONFIRMATION OF YOUR ORDER. INSTEAD IT IS A COMPLETE RECAP OF YOUR ORDER. UPON EXECUTION, AN ACTUAL TRADE CONFIRMATION WILL BE MAILED TO YOU. YOU CAN ALSO CONFIRM THE EXECUTION OF YOUR ORDER BY YOUR FINANCIAL ADVISOR, OR BY REFERRING TO THE TRANSACTION DETAIL SCREEN. |

FIG. 40

SYSTEM AND METHOD FOR DELIVERING A FINANCIAL MESSAGE

BACKGROUND OF THE INVENTION

1. Field of the Invention

The present invention relates to a system and method for delivering a financial message to users, and more particularly, an electronic message containing predefined financial information and financial updates.

2. Description of the Prior Art

New client demands, technological innovations and tighter regulatory controls are changing the shape of the money management industry. The evolution of the Internet and the development of new technological capabilities are pressing security houses to develop methods that facilitate the need for efficient trading. In traditional asset management, customers are advised by financial advisors who interact with traders to execute securities trades on behalf of the customer. The ability of a customer and their financial advisor to have current information regarding the customer's specific portfolio as well as general market conditions often makes the difference between profitability and unprofitability.

Heretofore, many have attempted to provide such information to customers through various means. One such example is shown in U.S. Pat. No. 5,872,921 to Zahariev et al., which teaches a system for analyzing a large data stream by applying time slices to create successive finite feed records which are compared to stored criteria for significance. U.S. Pat. No. 5,893,091 to Hunt teaches a system for electronically distributing information to users based on predefined criteria.

None of the related art references, however, teach a system and method for electronically providing users with financial updates regarding: order status, a user's specific portfolio and general financial information. In addition, none of the related art references teach the delivery of messages in accordance with predefined client user preferences such as specific account information; specific financial information; and the format of the message (e.g., detailed or summary). Furthermore, none of the related art references disclose a system and method which allows internal users (e.g., financial advisors) to monitor messages sent to client users as well as edit and/or add information in the messages.

SUMMARY OF THE INVENTION

In accordance with the present invention there is provided a system and method for delivering an electronic message to users. In particular, the present invention provides an electronic message containing order status, a specific user portfolio and/or general financial information for delivery to participating users. In addition, the system and method of the present invention allows the electronic message to be generated and delivered in accordance with predefined preferences. Moreover, the present invention provides varying levels of interactivity with users and/or their messaging accounts and an intervention system that allows an internal user to provide personalized notes to messages.

A first aspect of the invention provides a system for delivering a financial message to a client user regarding financial activity, comprising a registration system configured to register a client user and determine the messages received by the client user; a message creation system configured to monitor financial activity, create messages as requested by the client user regarding the activity and deliver messages; and an intervention system configured to allow an internal user of the system to add to or edit content of a message to a client user prior to delivery.

A second aspect of the invention provides an internal user interface system for an internal user of a financial message delivery system. The interface system comprises means for designating internal user message preferences; means for designating client user message preferences; means for viewing client user or internal user messages; means for replying to client user messages; means for creating messages; and means for searching for messages for a client user.

Another aspect of the invention provides a method for delivering a financial message to a client user comprising the steps of gathering client user message preferences from the client user; creating a client user message according to the client user message preferences; adding a personalized note from an internal user to a client user message prior to delivery; and delivering the message with the personalized note to the client user.

Advantageously, the systems and method of the present invention deliver an electronic message to client users in accordance with predefined preferences. In this way, users are provided with updated financial information in a streamlined, efficient manner. As such, the present invention affords users the ability to make intelligent, profitable, finance-related decisions. Furthermore, the systems and method provide mechanisms for internal users to better monitor client user messages and provide proactive advice via personalized notes, called touchpoints.

BRIEF DESCRIPTION OF THE DRAWINGS

These and other features and advantages of this invention will be more readily understood from the following detailed description of the various aspects of the invention taken in conjunction with the accompanying drawings in which:

FIG. 3 illustrates a first preferred embodiment of a client user preference interface of a registration system of the present invention;

FIG. 4 illustrates an additional aspect of the client user preference interface of FIG. 3;

FIG. 5 illustrates a second embodiment of a client user preference interface;

FIG. 7 illustrates an advisor preference interface;

FIG. 8 illustrates a client user searching interface;

FIG. 9 illustrates an internal user client user preference interface;

FIG. 25 illustrates a new product touchpoint entry interface;

FIG. 29 is a block diagram of additional features of the messaging system of FIG. 2;

FIG. 30 illustrates a first electronic message in summary format;

FIG. 33 lists the financial security status messages in the first preferred embodiment;

FIG. 34 illustrates a detailed electronic message relating to research reevaluation;

FIG. 35 illustrates a detailed electronic message relating to expiring options;

FIG. 36 illustrates a detailed electronic message relating to called bonds;

FIG. 37 illustrates a detailed electronic message relating to maturing securities;

FIG. 38 illustrates a detailed electronic message relating to order status;

FIG. 39 illustrates an electronic message defining possible order status;

FIG. 40 illustrates another electronic message defining possible order status;

DETAILED DESCRIPTION OF THE INVENTION

For convenience purposes only, the description includes the following sections:
I. Overview
II. Messaging System
  A. Registration System
  B. Security/Authentication System
  C. Internal User Interface System
  D. Message Creation System
  E. Compliance Review System
  F. Intervention System
  G. Additional Features
III. Messages
IV. Method I. Overview Generally stated, the present invention provides a computer implemented financial communication system and method for delivering high value electronic messages to users. The content of these messages is diverse and may include security order status, specific portfolio and general financial information. In addition, the system allows users to designate preferences for receiving the electronic message(s). Advantageously, the system also allows certain internal users, such as financial advisors, to intervene by adding or editing content (known as "touchpoints") to the delivered message in order to provide proactive and timely financial advice.

Figure 1:
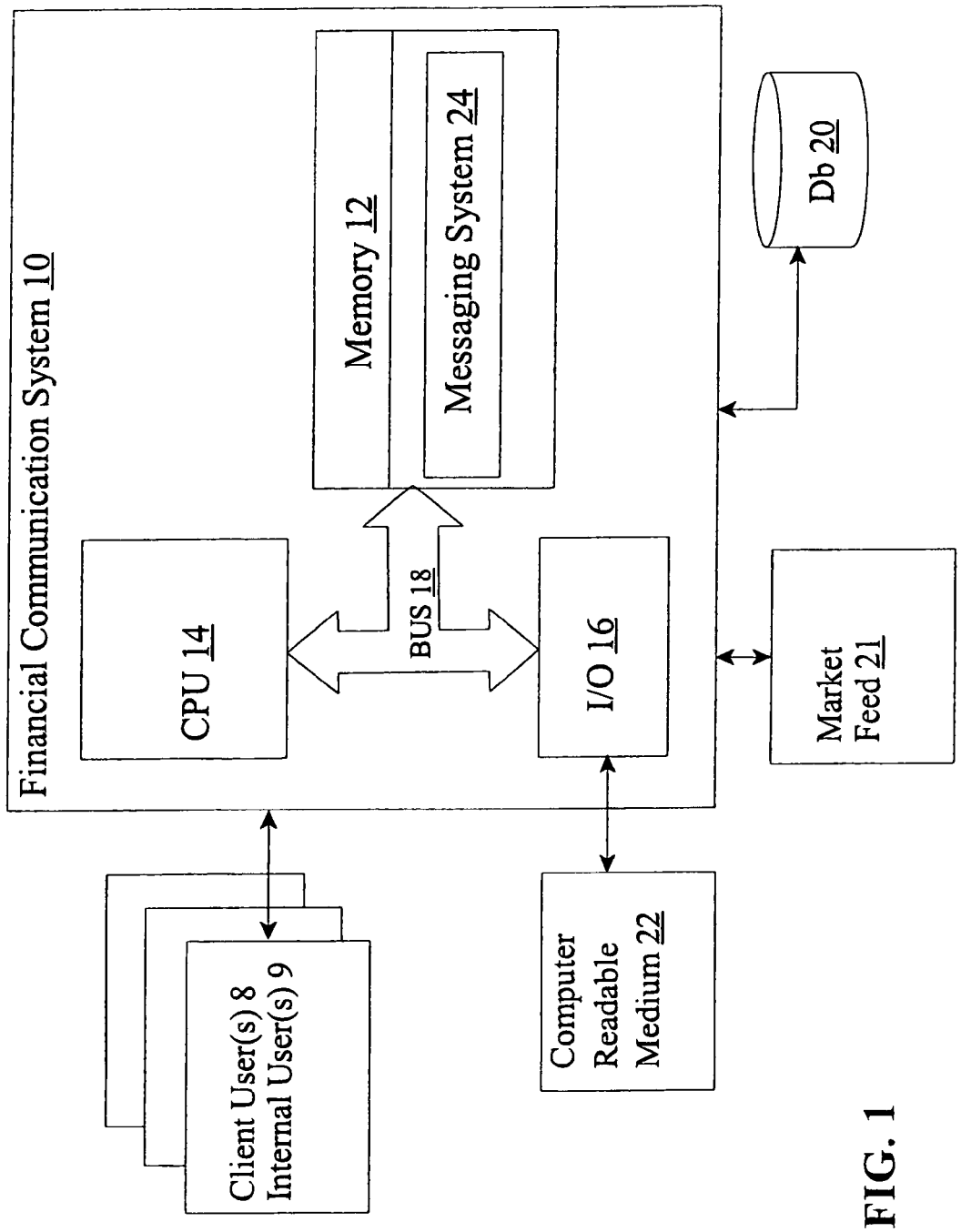
FIG. 1 is a block diagram of a financial communication system including a messaging system for delivering electronic messages in accordance with the invention.

FIG. 1 is a block diagram of a financial communication system 10 in accordance with a preferred embodiment of the present invention. System 10 is preferably a computer system that includes memory 12, CPU 14, input/output devices (I/O) 16, and bus 18. Database 20, as will be described in more detail below, may also be provided. A market feed 21 provides information such as real time price, quantity and quote information to system 10.

Memory 12 preferably includes a program product (messaging system 24) that, when executed by CPU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems. CPU 14 may likewise comprise a single processing unit, or a plurality of processing units distributed across one or more locations, e.g., on a client and server. I/O 16 may comprise any known type of input/output device including a network system, modem, keyboard, mouse, voice recognition system, CRT, printer, disc drives, etc. Additional components, such as cache memory, communication systems, system software, etc., may also be incorporated into system 10.

System 10 may reside on a personal computer that may or may not be part of a computer network. However, as recognized in the field, system 10 preferably includes one or more central computer, i.e., server. Here, system satellite servers may each contain only one system/module with the remainder of the systems/modules resident on a centrally located server. In another embodiment, a number of servers may be present in a central location, each having different software applications resident therein. Alternatively, a number of servers may reside in a central location, each containing all of the systems/modules resident therein. A server computer typically comprises an advanced mid-range multiprocessor-based server, such as the Ultra II from Sun Microsystems or the RS6000 from IBM, utilizing standard operating systems, software written in C++, Java or a similar language, which is designed to drive the operation of the particular hardware and which is compatible with other system components, and I/O controllers. A personal computer may typically comprise an INTEL PENTIUM III microprocessor, or like processor, such as found in a Dell Dimensions XTS T450 computer.

In the following discussion, it will be understood that the method steps discussed are preferably performed by processor 14 executing program product/instructions stored in memory 12, such as instructions of messaging system 24. Program product can be initially loaded into memory from a computer readable medium 22. It is understood that the various devices, modules, mechanisms and systems described herein may be realized in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods of the present invention. Alternatively, a specific use computer, containing specialized hardware for carrying out one or more of the functional tasks of the invention could be utilized. The present invention may also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

Figure 2:
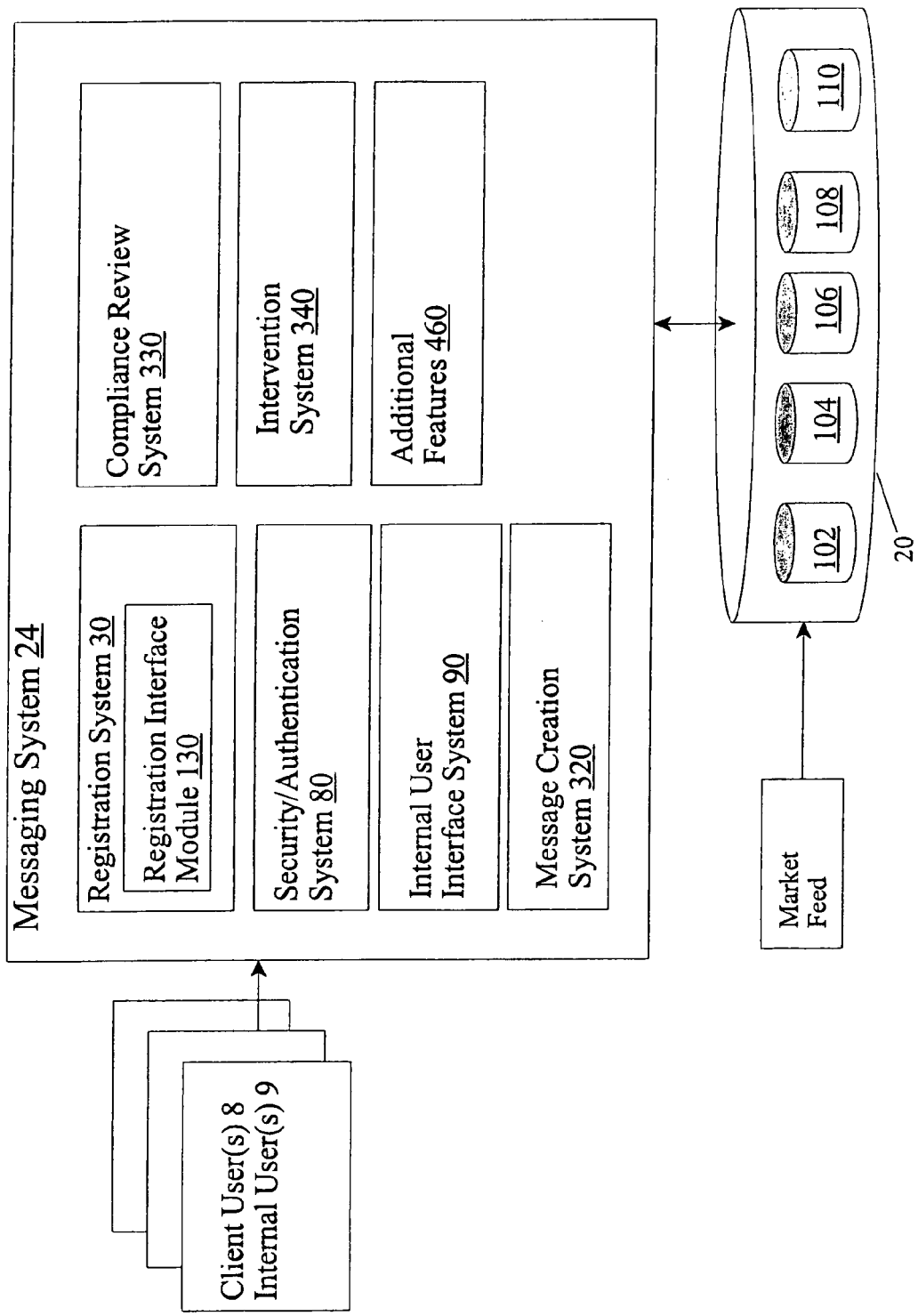
FIG. 2 is a block diagram of the messaging system of FIG. 1.

As used herein, a "user" refers to any individual or entity that uses system 10. Convenient subcategories of users may include "client users" 8 and "internal users" 9, as shown in FIGS. 1 and 2. A "client user" 8 may be any individual or entity that is a customer of the proprietor's system 10 such as an individual using an online transaction forum of a financial service corporation. An "internal user" 9 refers to a system proprietor's internal personnel. In the preferred financial service corporation setting, this may include financial advisors, managers, marketing agents, client service agents (CSA's), administrators and any other internal personnel of the system proprietor. System 10 provides for varying levels of permission for internal users to interact with the client users, as will be described below.

A user 8, 9 may access system 10 via a direct terminal connected to system 10, or a remote workstation in a client-server environment such as those indicated above. In the latter case, the client and server may be connected via the Internet, wide area networks (WAN), local area networks (LAN) or other private networks. The server and client may utilize conventional token ring connectivity for WAN, LAN, or other private networks, or Ethernet, or other conventional communications standards. Where a user 8, 9 is connected to a system server via the Internet, connectivity could be provided by conventional TCP/IP sockets-based protocol. In this instance, an Internet service provider outside system 10 would provide connectivity to a system server within system 10. In a preferred setting, client users 8 connect to system 10 via an online financial transaction forum, while an internal user 9 accesses system 10 via an internal application or browser interface such as those described in co-pending U.S. applications entitled "Systems for Providing Financial Services" and "Browser Interface and Network Based Financial Service System," both of which are expressly incorporated herein by reference.

II. Messaging System

Referring now to FIG. 2, messaging system 24 in accordance with the first preferred embodiment of the present invention is shown. In particular, messaging system 24 includes a registration system 30 including a registration interface module 130, a security and authentication system 80, an internal user interface system 90, a message creation system 320, a compliance review system 330, an intervention (touchpoint) system 340 and additional features 460. Also shown in FIG. 2 is a more detailed view of database 20 which may include, for example, a transaction database 102 for storing information relating to orders and their status, dividends and interest payments; a securities database 104 for storing information pertaining to expiring options, bond swaps, called bonds, maturing securities and research reevaluations; a margins database 106 for storing information pertaining to fed calls, equity calls, stock exchange calls and house calls; a holdings database 108 for storing information concerning account balances; and a preference database 110 for storing user preferences. It should be appreciated that database 20 can be comprised of any number of databases. For example, all data could be stored in one database. As mentioned above, market feed 21 provides real time price, quantity and quote information to messaging system 10, which may be stored in database 20 for convenience.

A. Registration System

Registration system 30 is configured to register a client user and determine the messages received by a client user. As mentioned above, in the preferred setting of a financial service corporation, a client user 8 may gain access to registration system 30 via a hypertext link on the system proprietor's website. In a most preferred setting, a client user 8 may gain access via an online transaction forum.

As shown in FIGS. 3-4, in accordance with a first embodiment of registration system 30, when a client user 8 first gains access to registration system 30, he or she is presented with a client user preference interface 31 created by registration interface module 130. Using client user preference interface 31, a client user 8 can set up their messaging account and preferences with system 10. As discussed below, user preferences determine the messages received by a client, format of the message, delivery device, etc. Among the preferences that can be designated are individual eligible accounts 32, delivery options 40, electronic mailing address 50 and desired message topics 54-66 (FIG. 4). When designating accounts 32, client user 8 can view each account 34 and designate specific accounts for the receipt of relevant messages. As shown, each account 34 is individually designated by checking a YES box 36. Alternatively, client user 8 may check a NO box 38, thereby indicating that relevant messages should not be provided. In the event user 8 neglects to check either box for a specific account 34, a default setting by the system proprietor will provide instructions for delivery or non-delivery of relevant messages. Of course, other means for designating accounts could be implemented. For example, all accounts could be designated with one check box.

Once designated accounts 34 are selected, delivery format 40 is chosen. This dictates the level of detail in the electronic message. Specifically, client user 8 can receive a detailed message 42 containing all pertinent information or a notification 44 with information in summary format. In the latter case, client user 8 receives a notification advising that the details of the relevant message are located within the messaging system, preferably in the user's inbox (shown in FIGS. 32 and 41). Once delivery format 40 has been designated, client user 8 designates the electronic mailing address 50 to which the message should be sent.

FIG. 4 illustrates an additional aspect of client user preference interface 31, namely, message topics designation window 52. Here, client user 8 designates specific topics 54-66 for which he or she would like to receive messages. As shown, the topics may include trading order status 54, research reevaluation 56, expiring options 58, maturing bonds, 60, called bonds 62, highlighted stocks list 64 and focus list recap 66. Order status 54 informs client user 8 of the status of a buy or sell order (e.g., open, partially executed, fully executed, canceled, etc.). Research reevaluation 56 informs client user 8 if specific portfolio securities have received new ratings (e.g., neutral, attractive, etc.). Expiring options 58 informs the user if any options in an individual portfolio are due to expire in an upcoming pre-determined time period. Likewise, maturing bonds 60 and called bonds 62 inform client user 8 if any bonds in an individual portfolio are due to expire or be called, respectively, in an upcoming pre-determined time period. Highlighted stocks list 64 presents client user 8 with a choice group of companies from the core investment themes identified by an internal strategy group. Focus list recap 66 provides client user 8 with a list of stocks, all rated "Buy" or "Attractive," selected by a committee of investment professionals. In preparing the focus list, a proprietary stop-loss mechanism is employed that is designed to minimize risk.

Message topics 54-66 can be grouped into three categories: (1) order status; (2) user financial security status; and (3) general information. Order status includes information pertaining to order(s) placed by client user 8, regardless of whether the order was based on a security currently in a user's portfolio (e.g., a buy order). User security status pertains to information concerning the user's individual portfolio, and includes, for example, research reevaluation 56, expiring options 58, maturing bonds 60 and called bonds 62. General information includes general financial information as well as highlighted stocks list 64 and focus list recap 66. Of course, other topics could be included. It is the intent of the present invention to provide a client user a message containing order status, customer financial security status and general information according to pre-designated preferences.

Specific topics 54-66 are designated for message receipt in the manner described above for designating accounts. Similarly, failure to check a box for a particular topic causes the system to default to a setting chosen by the system proprietor (i.e., delivery or non-delivery). Once the preferences have been designated by client user 8, the preferences are stored in database 20 (e.g., in preference database 110).

Figure 5:
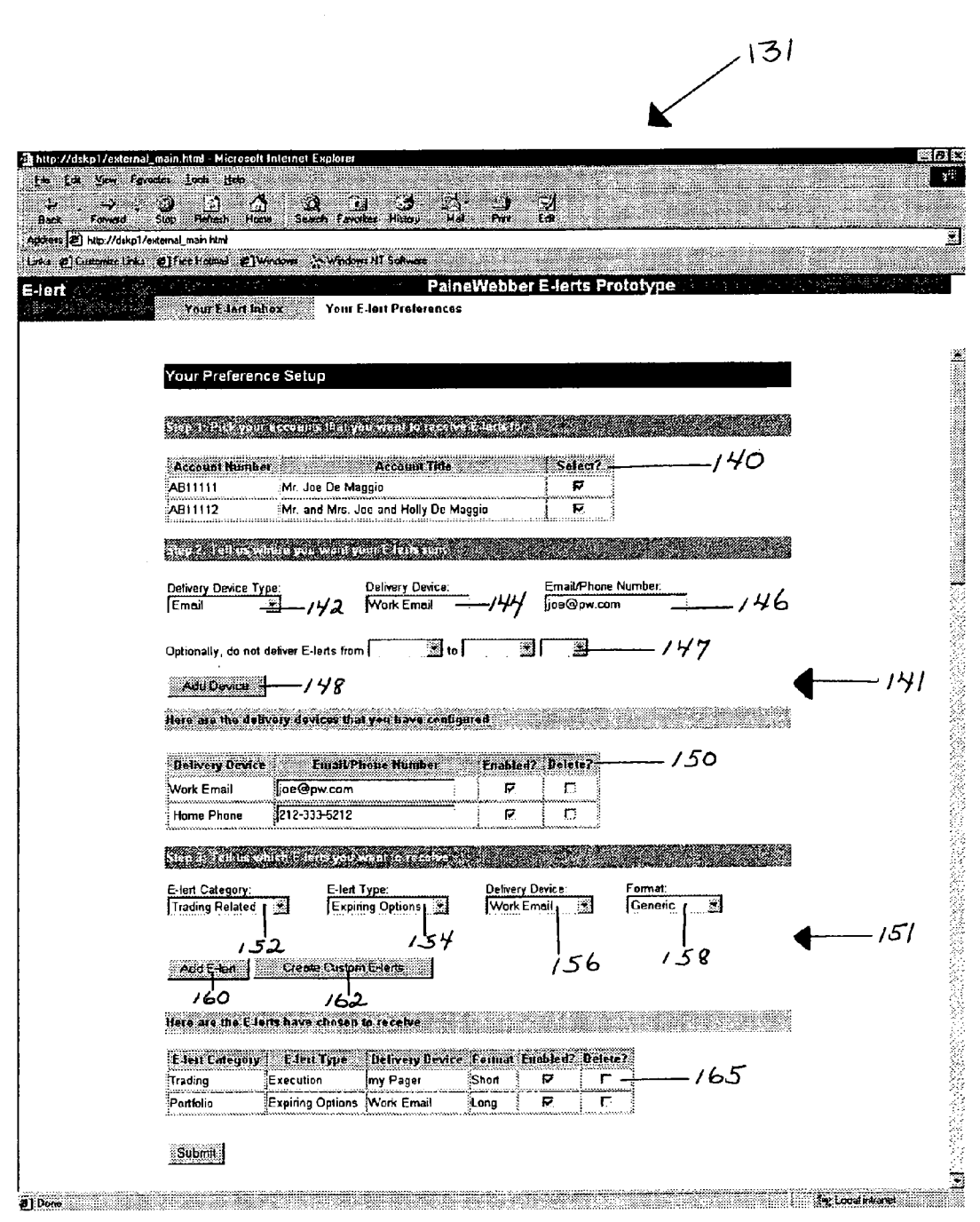

A second embodiment of a client user preference interface 131, created by registration interface module 130, is shown in FIG. 5. While client user interface module 131 provides similar features as the first embodiment, it also allows selection of additional messaging system 24 functionality. For instance, a selection of delivery criteria 141 is provided, as discussed below.

Turning to the details of client user preference interface 131, a client user 8 may select the financial accounts 140 for which they wish to receive messages. This allows a user with multiple accounts to individually designate accounts for the receipt of messages. Once accounts 140 are selected, client user 8 designates delivery criteria 141 to add or edit delivery options. As shown, user 8 may choose delivery device types 142, delivery device name 144, and device address 146. Delivery device types 142 may include facsimile, electronic mail, telephone, pager, personal digital assistant or other wireless devices, as well as any other device known or hereafter developed. Delivery device name 144 selection allows user 8 to designate a particular name for each identified delivery device type. Delivery address 146 allows user 8 to specify necessary routing information (e.g., electronic mailing address) to ensure proper delivery of the message. User 8 can also specify a particular time or date 147 during which delivery of messages is disabled. This allows user 8 to minimize interruptions or the occurrences of messages sent at unfavorable times. Add button 148 adds the above-indicated delivery criteria 141 to the user's messaging account so that the designated delivery criteria need only be input once. By manipulating criteria toggle 150, user 8 can enable or delete previously designated delivery criteria 141.

Figure 32:
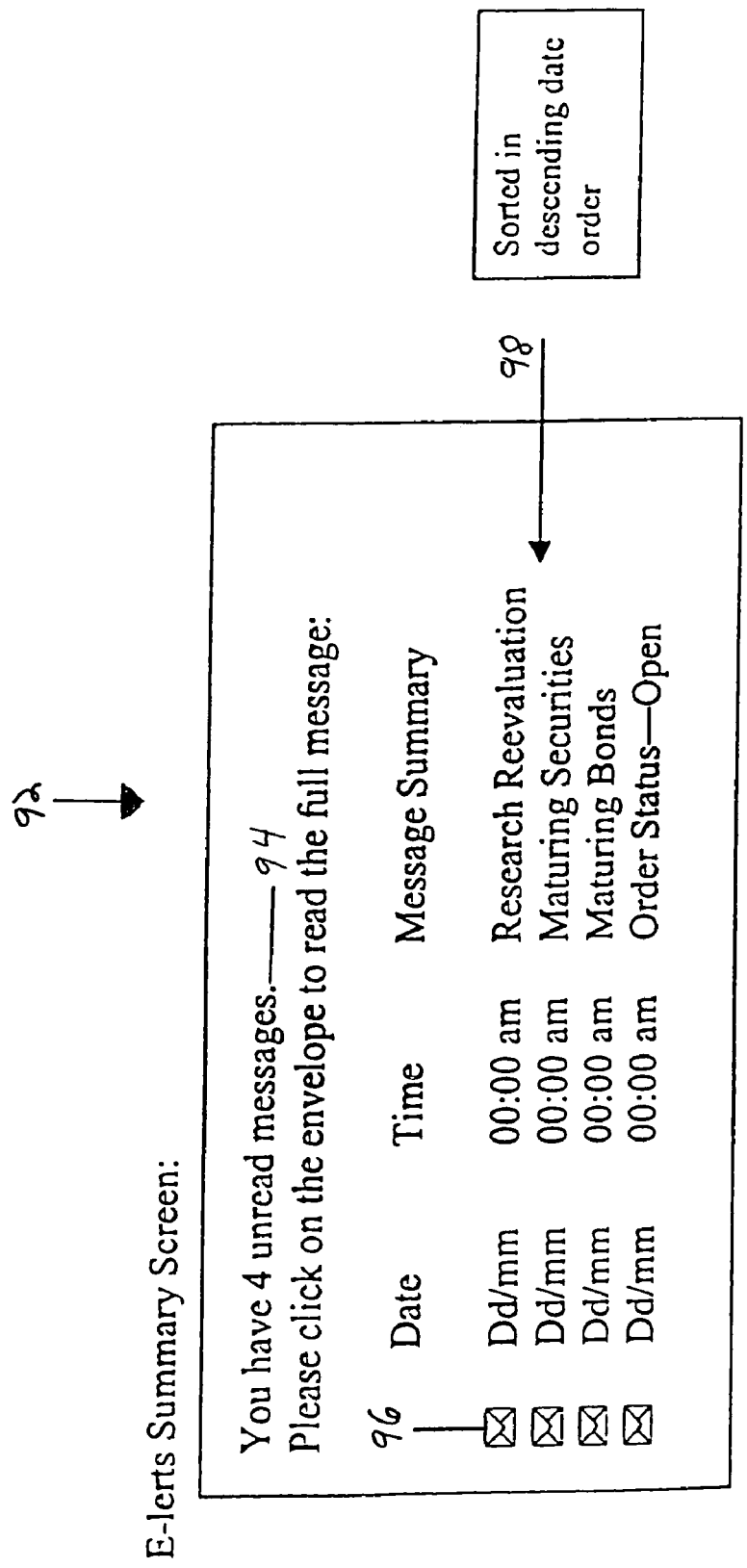
FIG. 32 illustrates a client user message viewing window, or inbox, in accordance with a first preferred embodiment.
Figure 41:
FIG. 41 illustrates a client user message viewing window, or inbox, in accordance with a second preferred embodiment.

Once delivery criteria 141 are designated, message criteria 151 is utilized to add or edit message requests. This allows user 8 to select receipt of specific financial messages. Message criteria 151 includes message category 152, message topic/type 154, delivery device 156 and message format 158. As discussed above, the message types can be grouped into one or more categories. Within each category 152, user 8 can select a particular message topic/type 154 to receive, such as "expiring options," as well as a specific delivery device 156 as previously designated at delivery criteria 141. User 8 also indicates message formats, e.g., in generic, short or detailed format. A generic format indicates only that a message relating to a user portfolio is available, similar to the above discussed notification. A user must then log onto system 10, e.g., through an online transaction forum for client users 8, and go to their inbox (FIGS. 32 and 41). If user 8 chooses the short format, only a highlight of a message is sent to designated delivery device 156 with the details routed to the user's inbox (FIGS. 32 and 41). By way of contrast, where a detailed format is chosen, all details are sent to designated delivery device 156.

User 8 can add message criteria 151 to his or her messaging account by selecting the add button 160. As with delivery criteria 141, a criteria toggle 165 is provided to allow user 8 to enable or delete previously designated message criteria 151. Once all preferences/criteria have been designated, they are preferably stored in database 20 (e.g., preference database 110) and accessed by message creation system 320, as will be described below. It should be understood that the preferences/criteria illustrated in FIGS. 3-5 are not intended to be exhaustive and other functions may be provided.

B. Security/Authentication System

When active users (i.e., registered client users 8 and internal users 9) establish communication with system 10, security and authentication system 80 queries the user for a password and preferably other authentication information, such as a universal user name. Security and authentication system 80 is described in detail in co-pending U.S. applications entitled "Systems for Providing Financial Services" and "Browser Interface and Network Based Financial Service System," which are both expressly incorporated herein by reference.

As mentioned above, client user 8 preferably accesses system 10 via an online transaction forum, while an internal user accesses system 10 via an internal application or browser interface. In the case of an active client user 8, system 10 may initially differentiate that registered client user from a non-registered client user by, for example, the presence of a 'cookie' on the user's system. Authentication information is transmitted to a security function (not shown) resident in system 10 where user 8, 9 is authenticated. This procedure provides for confirmation of the user's 8, 9 identity. Of course, a user 8, 9 will be denied access to system 10 where authentication does not occur. The security functionality described herein also provides a single point of security control for adding or removing a user 8, 9 from system 10.

Security and authentication system 80 also controls each user's entitlement to interact with system 10. Alternatively, another authentication system outside of system 10 may serve to authenticate a user. In this instance, security and authentication system 80 would receive this information from the outside system and store user entitlements in security and authentication system 80. In addition, a system proprietor may designate specific users 8, 9 eligible to interface with system 10. Advantageously, this feature restricts use of system 10 to selected users or user groups. This allows for varying levels of interaction by various user groups/types.

Once authenticated, a user 8, 9 is brought to an appropriate interface, as will be described in more detail below. The routing of users to their appropriate interfaces is accomplished by security and authentication system 80. For instance, when an unregistered client user 8 accesses system 10, they are brought to client user preference registration system 30 and client user preference interface 31, 131. A registered client user 8 will be brought to their inbox (FIGS. 32 and 41) and internal users 9 to internal user interface system 90 as described below.

C. Internal User Interface System

Figure 6:
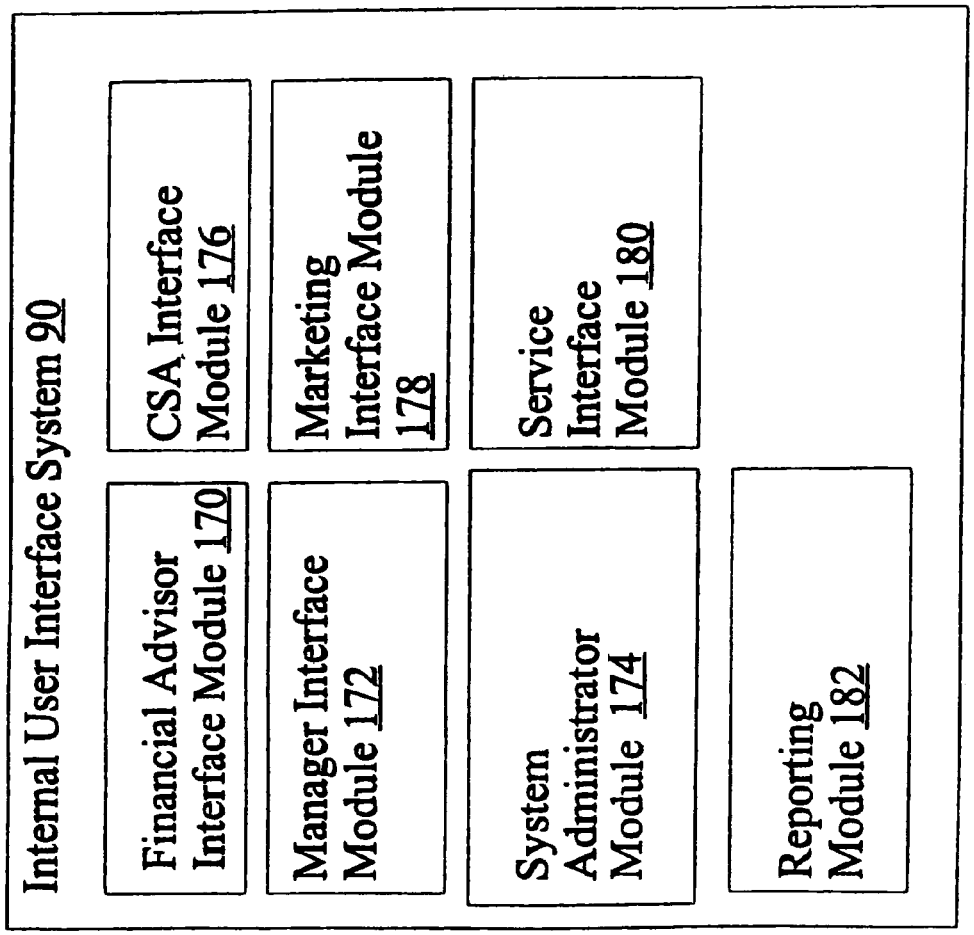
FIG. 6 is a block diagram of an internal user interface system.

When an internal user 9 accesses system 10 via, for example, the above-mentioned "Systems for Providing Financial Services" and "Browser Interface and Network Based Financial Service System," an internal user interface system 90, shown in FIG. 6, is activated. Internal user interface system 90 (IUI system) provides a variety of functions advantageous to specific internal users. For instance, via IUI system 90 internal users 9 may designate financial advisor (FA) preferences, designate client user preferences, search client users, edit specific client users for the receipt of a particular message and view client user and/or internal user messages. As shown in FIG. 6, IUI system 90 includes a financial advisor interface module 170, a manager interface module 172, a system administration interface module 174, a CSA interface module 176, a marketing interface module 178, a service interface module 180 and a reporting module 182. The particular modules accessible to internal user 9 depends on their entitlement level as determined by security and authentication system 80.

While the details of each interface module's functions will be described below, it should be recognized, although not expressly shown, that IUI system 90 may also include precursor selection interfaces and/or menus specific to a particular internal user 9 which allows user 9 to move between allowable (i.e., entitled) interfaces. For instance, each interface in FIGS. 7-17 includes a menu on left side of the display for moving between entitled interfaces. Furthermore, it should be recognized that while certain functions will be described as part of specific modules/interfaces, the entitlement level of certain internal users 9 may allow access to a variety functions outside of the particular 'main' module. For example, an advisor may be able to create message templates although that is described as a marketing interface module function. Accordingly, the compartmentalization of functions into a particularly termed module/interface should not be interpreted as a limitation on the internal users 9 that may access those functions.

Figure 7:
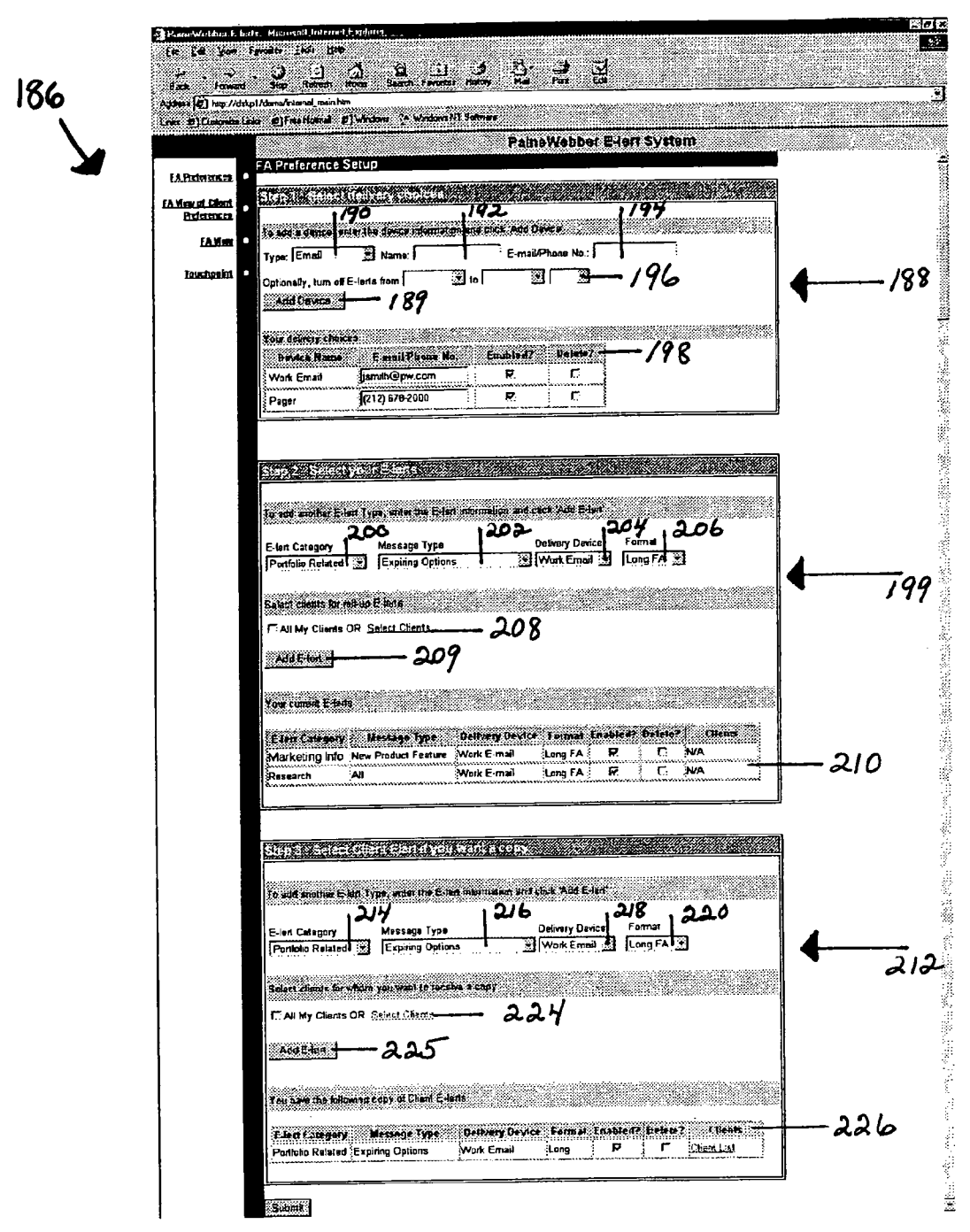

Referring now to FIG. 7, an advisor preference interface 186, created by financial advisor interface module 170, is shown. As with client user's preference interface 32, 132, a financial advisor may select preferences for receiving his or her messages from interface 186. First, an advisor may designate delivery criteria 188 by designating delivery type 190, delivery device name 192 and delivery address 194. In addition, the advisor can designate times and/or dates 196 for which messages should be disabled. Once the desired delivery criteria 188 have been designated, the advisor can save the criteria to their messaging account by selecting add button 189 and enable or delete each delivery criteria individually via delivery criteria toggle 198.

Figure 8:
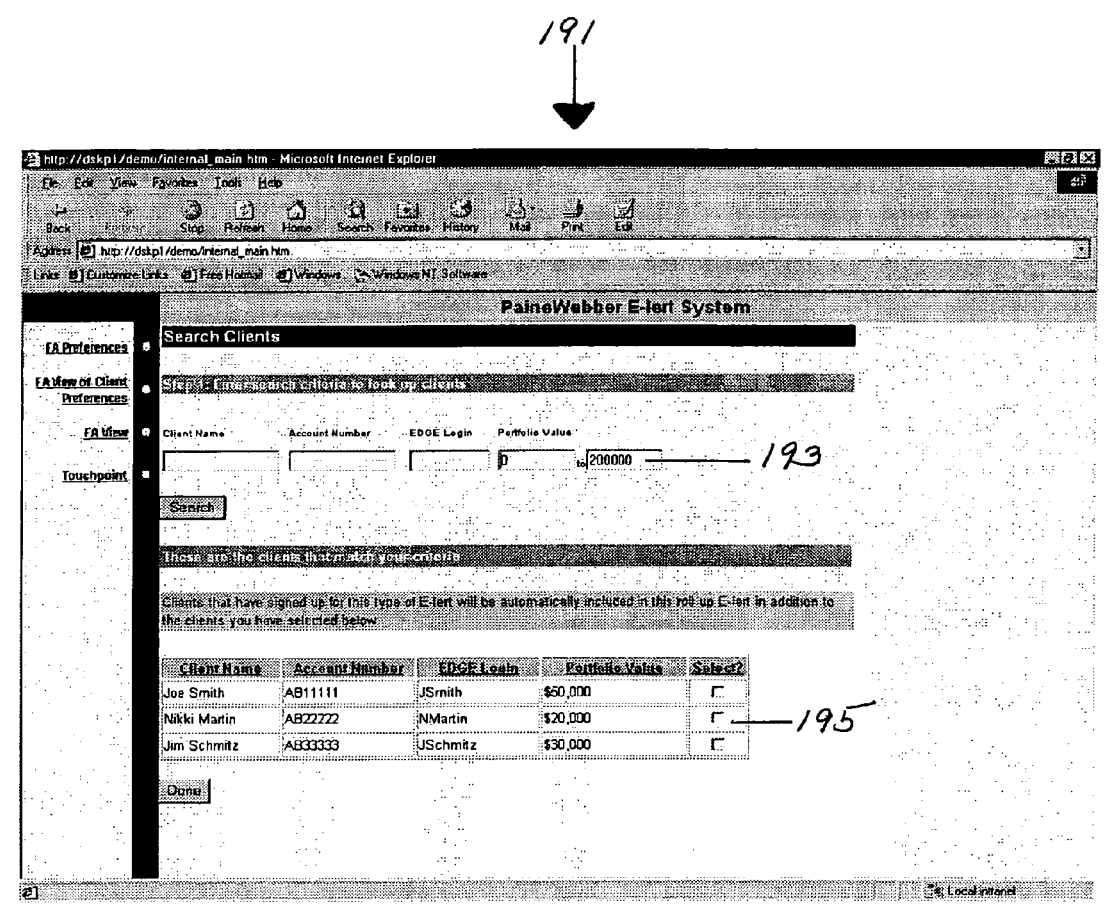

After delivery criteria 188 have been designated, the advisor designates his or her message criteria 199. As illustrated, an advisor can select a message category 200, a message topic/type 202, a delivery device 204 for the message and a message format 206. In addition, an advisor can select specific client users 208 (e.g., individual, all client users or client user group) about whom the advisor will receive such messages. In order to select individual client users 8, the advisor can perform a system search for a particular client user. For example, as shown in FIG. 8, an advisor can access a client user search interface 191 using the select user's feature 208 from the advisor preference interface 186 of FIG. 7. At interface 191, the advisor can search for a particular client user 8 using various user identifiers 193 such as name, account number, login, portfolio value/value range, or the like. User viewing window 195 lists all client users 8 matching the advisor's search, which the advisor can then individually select.

Returning to FIG. 7, once the advisor's message criteria 199 have been designated, the advisor can select add button 209 and the message criteria is saved to the advisor's messaging account. Message criteria toggle 210 allows the advisor to enable or delete each criteria individually. In addition, the advisor can designate advisor copy criteria 212 if they desire to receive a copy of any or all client user 8 messages. By utilizing advisor copy criteria 212, the advisor can accomplish this and thus avoid having to independently determine the messages received by specific client users 8. This is accomplished by selecting message category 214, message topic/type 216, delivery device 218, delivery format 220 and cross-referencing these selections to specific client user(s) 224. Client users can be selected by categories such as all customers, groups or individually. Where client users 8 are selected in groups or individually, the advisor may utilize user search window 191 of FIG. 8, as described above. Add button 225 allows the advisor criteria 212 to be saved to the advisors messaging account. Similar to the other criteria described herein, the advisor can delete or enable each customer copy criteria via criteria toggle 226.

It should be appreciated that other functions can be performed by the advisor and those listed herein are not intended to be exhaustive. For example, the advisor may have capability/permission to send manual messages independent of financial messages.

Figure 9:
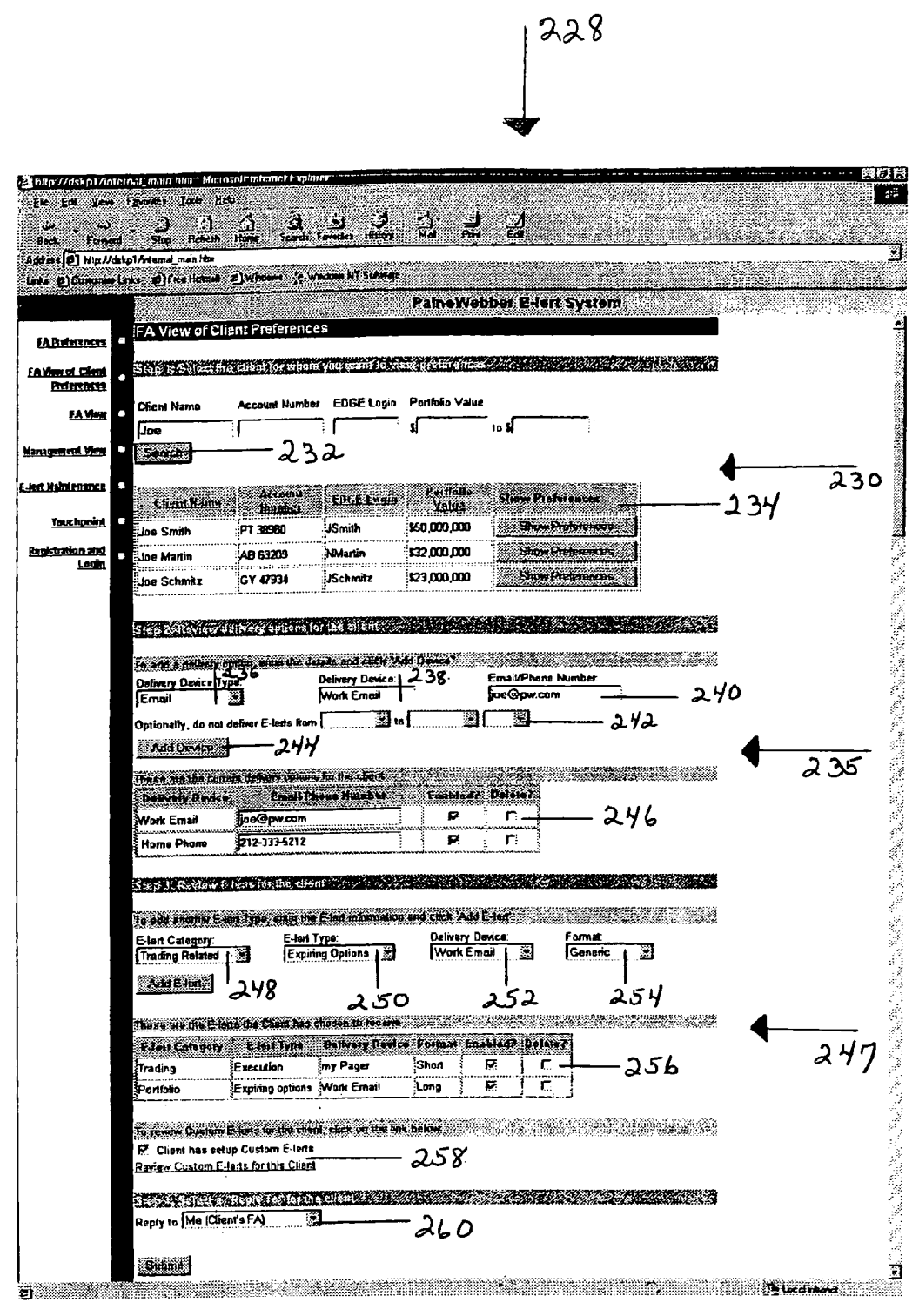

Referring now to FIG. 9, an advisor client user preference designation interface 228, created by financial advisor interface module 170, is shown. This interface 228 allows an advisor (and other internal users 9 with similar permissions) to view, edit or designate preferences on behalf of a client user 8. The advisor can view a particular client user's preferences by entering search criteria 230 and performing a search 232 using a client user search mechanism. As discussed above, the search can be performed based on various factors such as name, account number, login, portfolio value, and the like. The results of the advisor's search are displayed on client user viewing window 234. When a particular client user is selected, the client user's preferences are displayed as delivery criteria 235 and message criteria 247. As described above, at delivery criteria 235, the advisor can add or edit delivery options including delivery device type 236, delivery device name 238 and delivery address 240. Moreover, the advisor can designate a time or date 242 when messaging is disabled. Once the desired delivery criteria 235 have been designated, the advisor can save the criteria 235 to a client user's messaging account by selecting add button 244. By manipulating criteria toggle 246, the advisor may also enable or delete each delivery criteria. After delivery criteria 235 have been designated, the advisor designates the client user message criteria 247 as explained above. Specifically, the advisor selects message category 248, message topic/type 250, delivery device 252, and message format 254, as well as enable/delete messages via criteria toggle 256.

Additional features for use by the advisor include mechanism 258 for determining if a client user 8 desires custom messages as well as a mechanism for viewing such messages. Further, a reply destination selector 260 allows the advisor to determine the routing of a client user's reply to a message. Preferably, the reply is routed to the advisor or other internal user 9. The ability of advisors and/or other internal users 9 to be able to designate client user 8 preferences not only enhances service, but also aids in ensuring that the most relevant financial information is received by client user 8.

Figure 10:
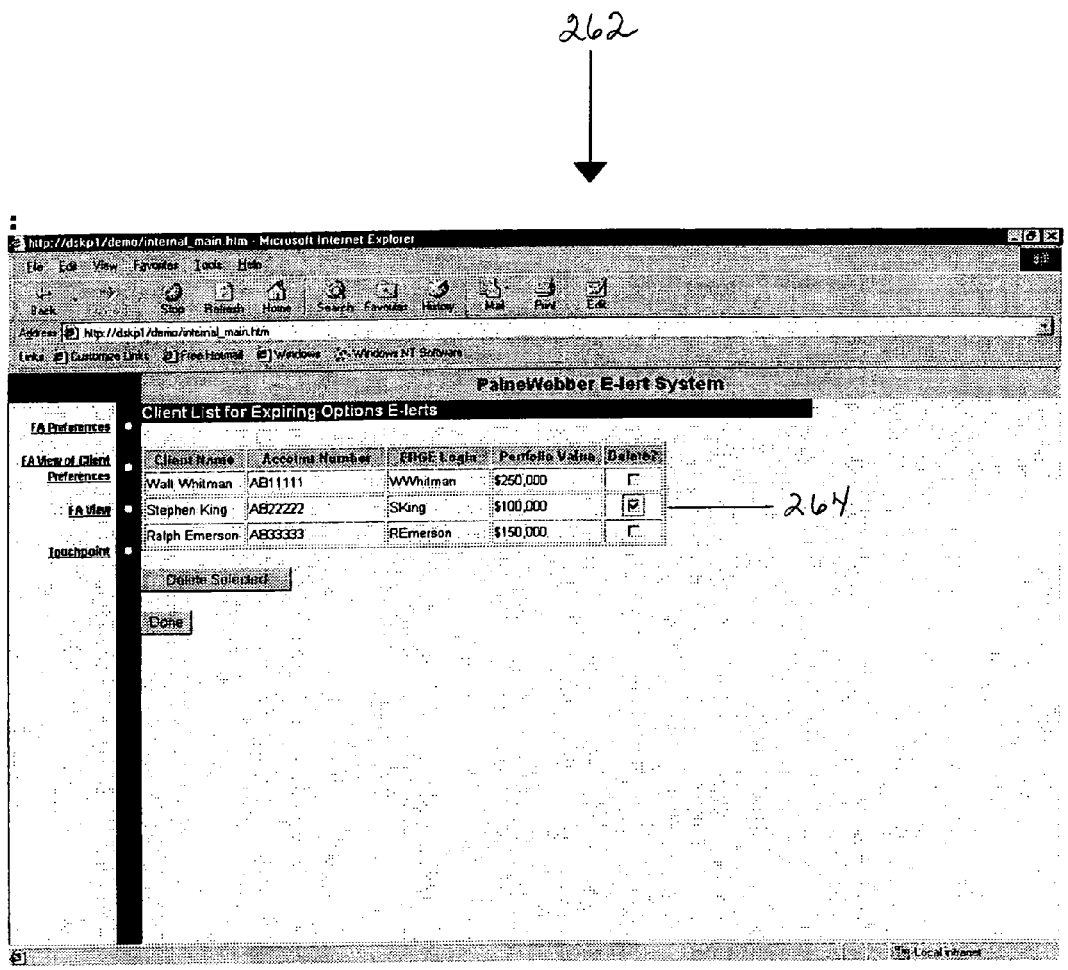
FIG. 10 illustrates a client user list edit interface.

FIG. 10 shows a client user list edit interface 262 that allows an advisor or other entitled internal user 9 to view and/or edit client user's assigned to receive particular messages or message topics/types. The example shown in FIG. 10 lists all client users 8 of a particular advisor designated to receive messages concerning expiring options. Listed for each client user 8 are identifiers such as their account number, login, etc. A user can be "tagged" for non-receipt of the message by the client user list toggle 264. Accordingly, internal users 9 can prevent transmission of information that may be misunderstood, misused, etc., by a client user 8. This feature also provides a safeguard mechanism for preventing transmission of messages that are inappropriate relative to legal and regulatory matters.

Figure 11:
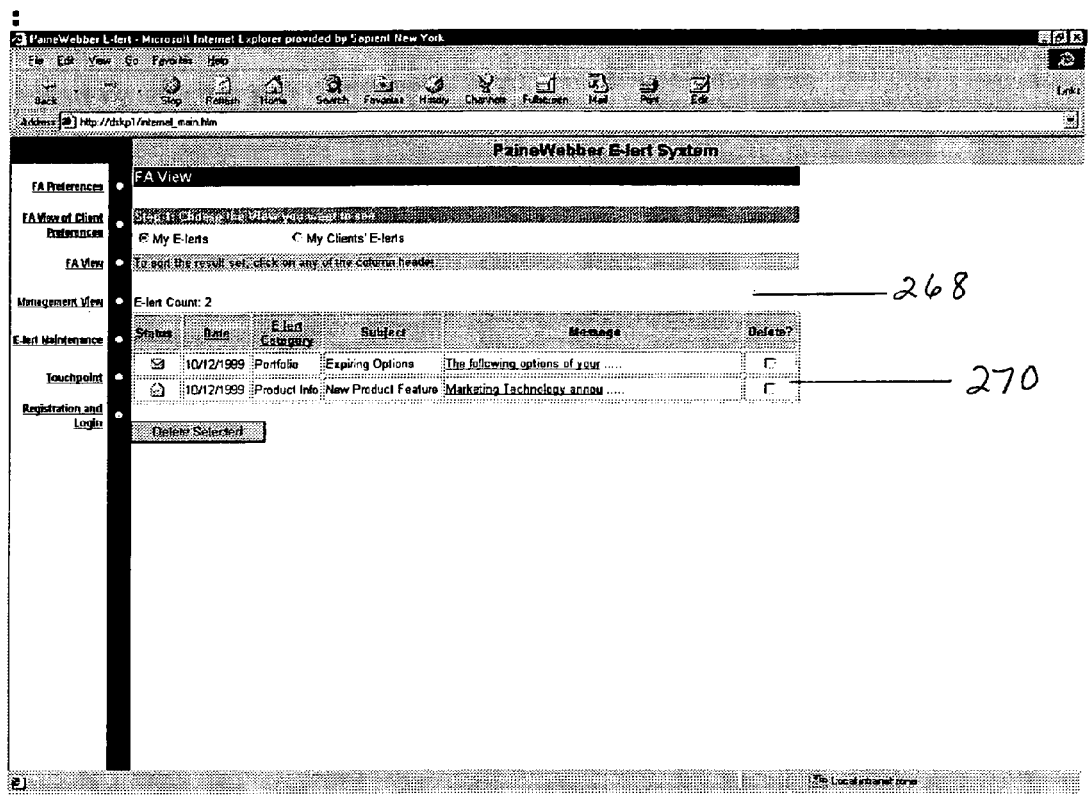
FIG. 11 illustrates an advisor message viewing interface.

FIG. 11 illustrates an advisor message viewing interface or inbox 266 that allows the advisor to selectively view client user or advisor messages using view selector 268. Shown in FIG. 11 are the messages received in response to preferences designated by the advisor at advisor preference interface 186 (FIG. 7). In message display window 270, the advisor is alerted as to, for example, the status of the message (e.g., read or unread), the date received, the message category, the message type and a message subject. In addition, the advisor can delete any messages from the inbox 266. If the advisor selects to view client user messages at view selector 268, the messages for the client users are shown. However, the advisor cannot choose to delete client user messages from the inbox 266.

Figure 12:
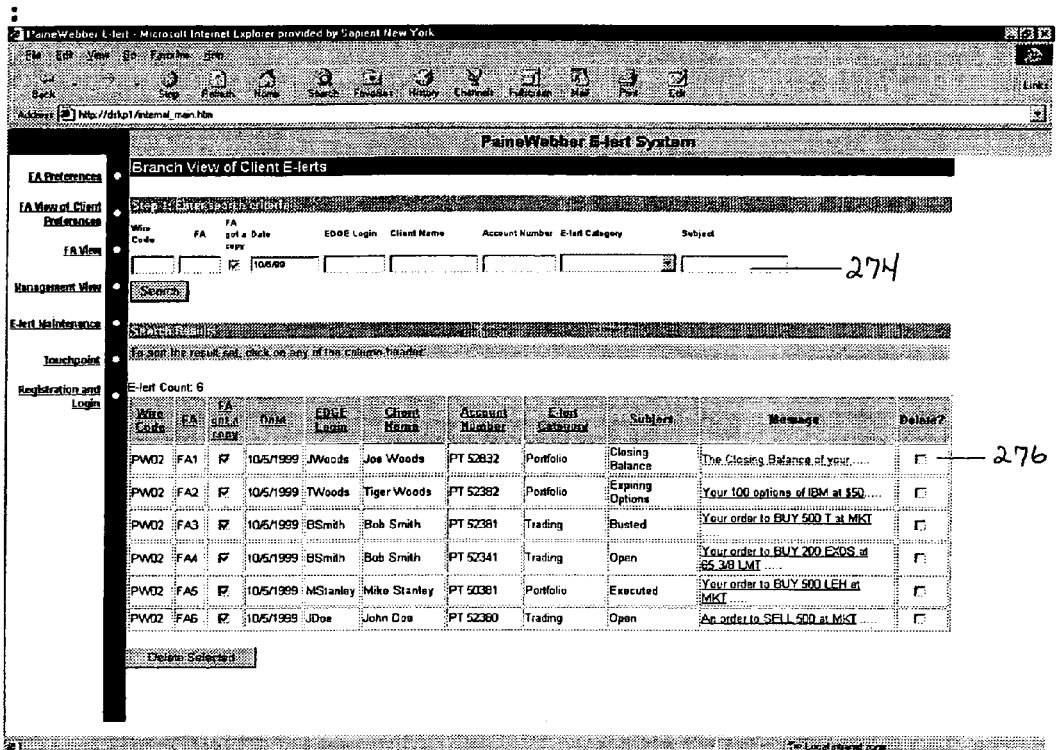
FIG. 12 illustrates a manager message viewing interface.

FIG. 12 shows a manager user message viewing interface 272, created by manager interface module 172 (FIG. 6), that allows managers to view individual user and/or advisor messages. Users 8, 9 can be searched by search criteria 274 such as advisor, client user name, date, login, account, message type or any other known way to identify users. For example, where users are searched by date of message, all users receiving a message on the indicated date would be shown in message display window 276. Message display window 276 can indicate branch code (wire code), advisors, whether the advisor received a copy, user login, user name, user account, message category, etc. In addition, the manager can read and/or delete the messages from the message display window 276. Where a manager desires to reply to a message, they utilize a message reply window similar to that illustrated in FIG. 42. In addition, the reply can be routed to an internal or external system user. It should be appreciated, however, that other features can be made available to managers and those described herein are not intended to be exhaustive.

Figure 13:
FIG. 13 illustrates a client service agent message viewing interface showing client user messages.

CSA interface module 176, shown in FIG. 6, allows CSA's to search users, designate user preferences, view advisor or client user messages. Other features can be made available to CSA's; for example, the capability to edit message templates, etc. FIG. 13 illustrates a client service agent message viewing interface or inbox 278 where CSA's can view either advisor or client user messages by selecting the appropriate indicator on the view selector 280. Where the CSA seeks to view client user messages, as shown in FIG. 13, they can search for particular client users as described above. Specifically, the CSA can enter search criteria 282 including identification indicators so that a particular client user or user group is identified. In the message viewing window 284, all messages for users matching search criteria 282 are listed. In addition, message viewing window 284 indicates codes, advisors, whether the advisor received a copy, user login, user name, user account, message category, etc. and allows the CSA to read and/or delete specific messages.

Figure 14:
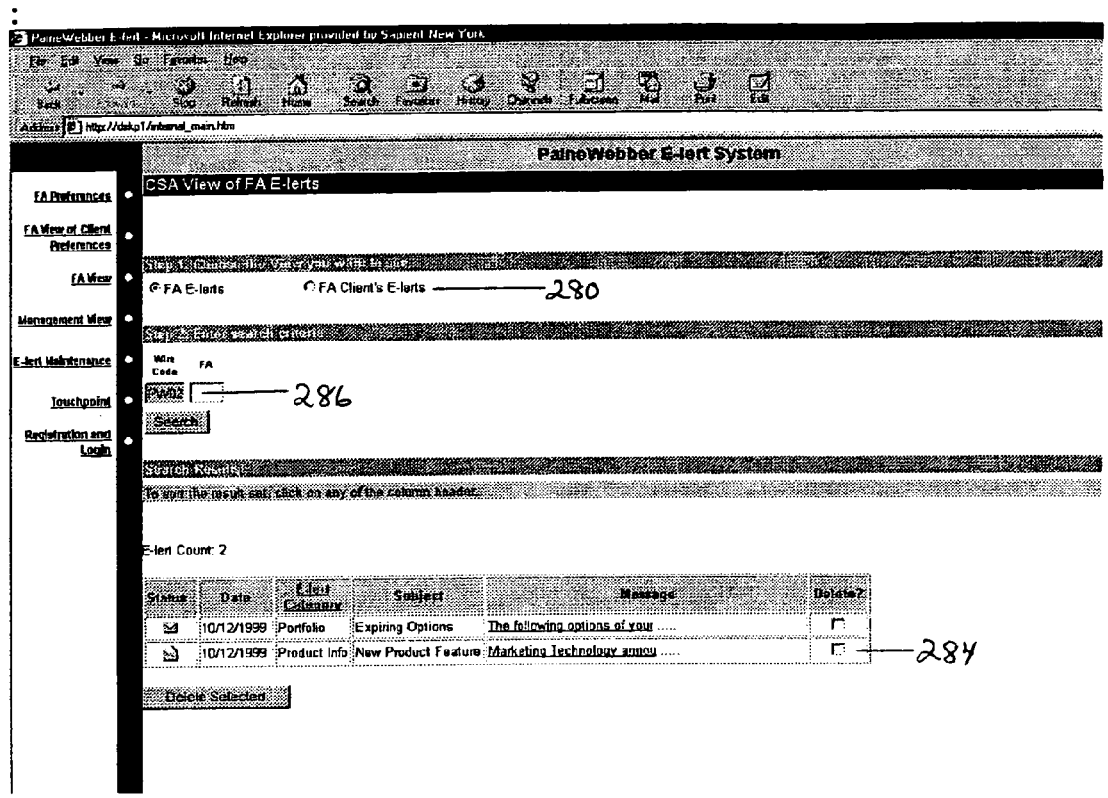
FIG. 14 illustrates a client service agent message viewing interface showing advisor messages.

As shown in FIG. 14, where the CSA desires to view advisor messages, the advisor indicator of view selector 280 is activated. Particular advisors may be searched by entering advisor search criteria 286 with all advisor messages matching the search criteria 286 listed in message viewing window 284 along with relevant message information (i.e., message status, date of message, etc.). The CSA can read and/or delete the messages individually.

System administration module 174, shown in FIG. 6, allows administrators to edit message templates and send manual messages to advisors or other users. "Manual messages" are those sent independent of a message to a particular user generated by system 10. For example, a manual message can be a message from an administrator to an advisor.

Figure 15:
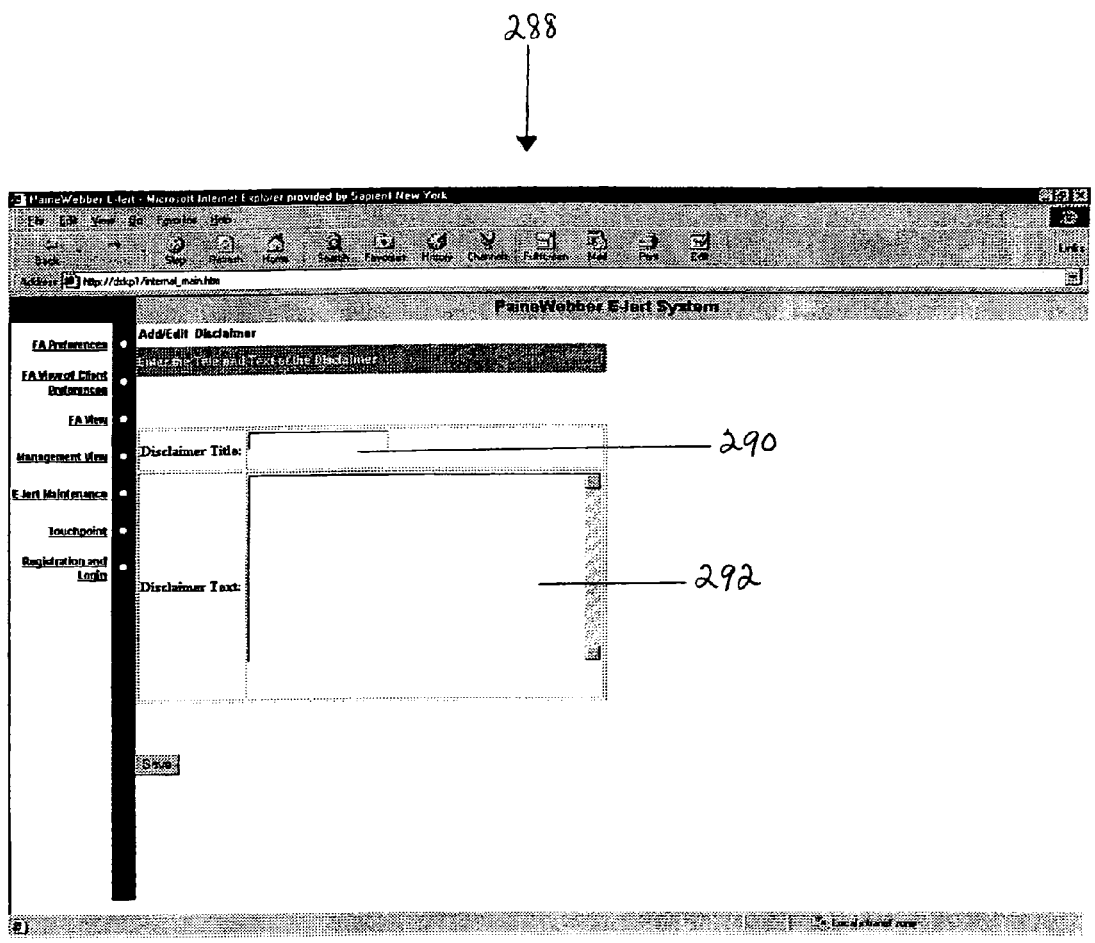
FIG. 15 illustrates a message disclaimer interface.

More specifically, system administrator module 174 allows a system administrator to add and/or edit message disclaimers, designate new message types and designate delivery devices, create and/or edit message templates and send manual messages. FIG. 15 shows a disclaimer interface 288 created by system administrator module 174, where system administrators can edit or add message disclaimers (e.g., legal disclaimers). In adding a disclaimer, the system administrator designates a title in disclaimer title window 290 and manually enters or imports the desired language into disclaimer text window 292 in any known fashion. The disclaimer is then provided to all messages or particular messages to which the disclaimer relates.

Figure 16:
FIG. 16 illustrates a new message type designation interface.

FIG. 16 shows a message type creating interface 294, created by system administrator module 174, where new message types can be created or existing message types can be edited. For example, where the system administrator desires to add a new message type, he or she would designate the appropriate type criteria 296 by specifying details such as the message type and category; database 20, 102-110 (where the relevant financial information can be found); the appropriate disclaimer, if any, to accompany the message; the date of creation of the new message type; the frequency in which the message should be delivered; the date on which delivery should commence; and the date on which the delivery of the message should cease. Once type criteria 296 have been designated, device criteria 298 may be specified. By way of example, system 10 will support listed devices 300. Audience selector 302 indicates the users or user groups to which the message type is available, which may be altered using drop down selection boxes. As shown, an internal user 9 creating the new message type can designate one or more user groups that can receive the new message to each delivery device 300. The short format 304, long format 306, advisor format 308 and generic format 310 selectors allows the user creating the message type to indicate the message format available for delivery to each device 300. By selecting indicator 312, the user can designate the devices and corresponding audiences and formats available for the designated type criteria 296.

Figure 17:
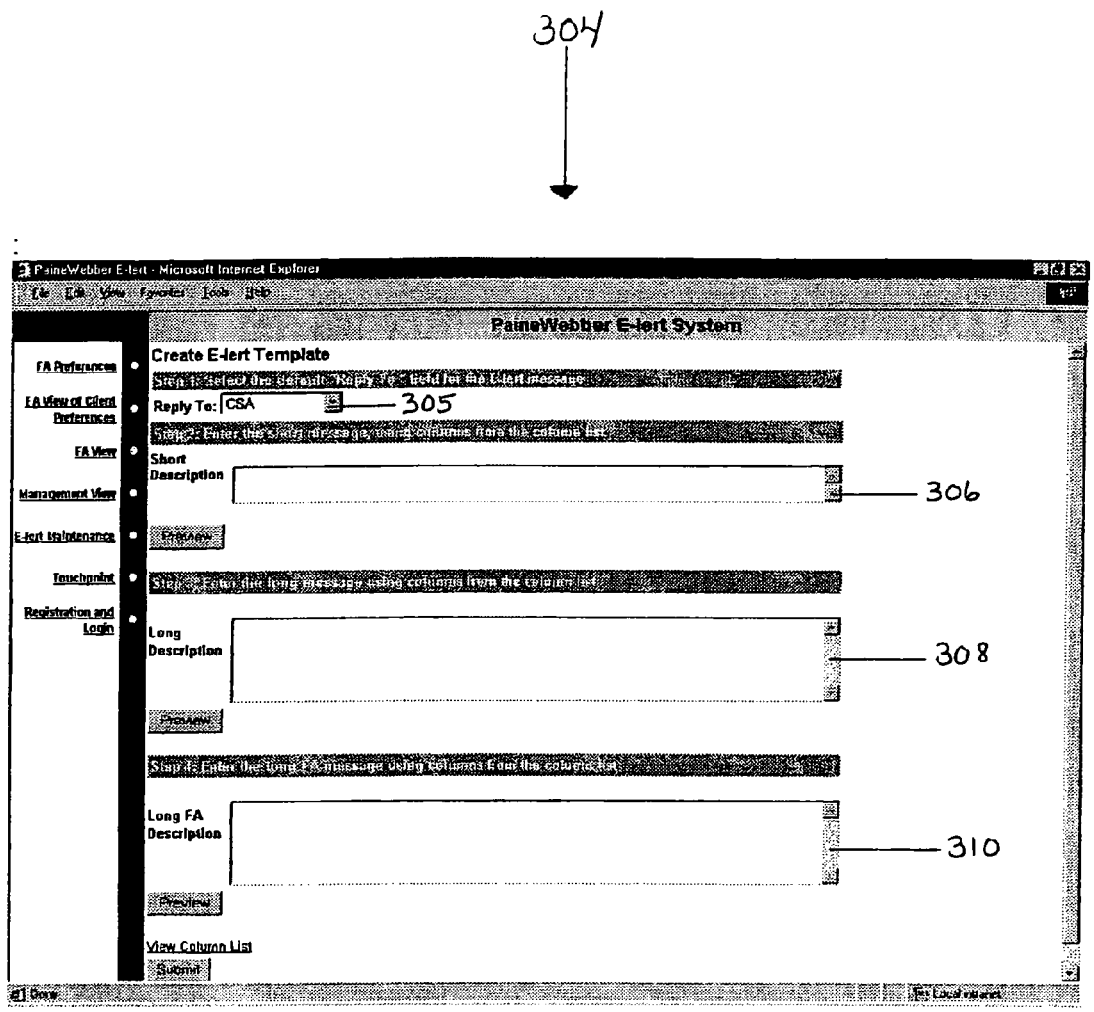
FIG. 17 illustrates a message template creation interface.

FIG. 17 illustrates message template editing interface 304, created by system administrator module 174, which allows internal users 9 to edit and/or create new message templates for particular message topics/types. A new template may include a default reply address 305 which routes recipient replies to a specific user. Once set, the default may be changed by other internal users 9, such as the advisor, as described above. After reply address 305 is selected, appropriate short, long and advisor messages are entered into windows 306, 308 and 310.

Referring back to FIG. 6, a service interface module 180 allows service agents to search users as described in conjunction with FIGS. 8 and 9, and designate user preferences in a manner similar to that explained in conjunction with FIG. 9, as well as any other desired function within the scope of the present invention.

Reporting system 182, shown in FIG. 6, generates and maintains various reports including changes to preferences, enrollment, inbox status, messages delivered, messages types selected, messages touchpointed, touchpoint details, etc. As indicated above, the access to the reports is controlled by security and authentication system 80. This is accomplished in a manner similar to the routing of users to their appropriate interface upon log-in. Specifically, by entering a particular login identification and/or password, security and authentication system 80 allows users to access reports according to pre-determined entitlements or permissions.

It should be understood that the interfaces/windows of FIGS. 7-17 and the criteria/fields thereof are shown for illustrative purposes and that each interface/window could include more or fewer features. In addition, it should be understood that the features of each window were discussed in no particular order.

D. Message Creation System

Figure 18:
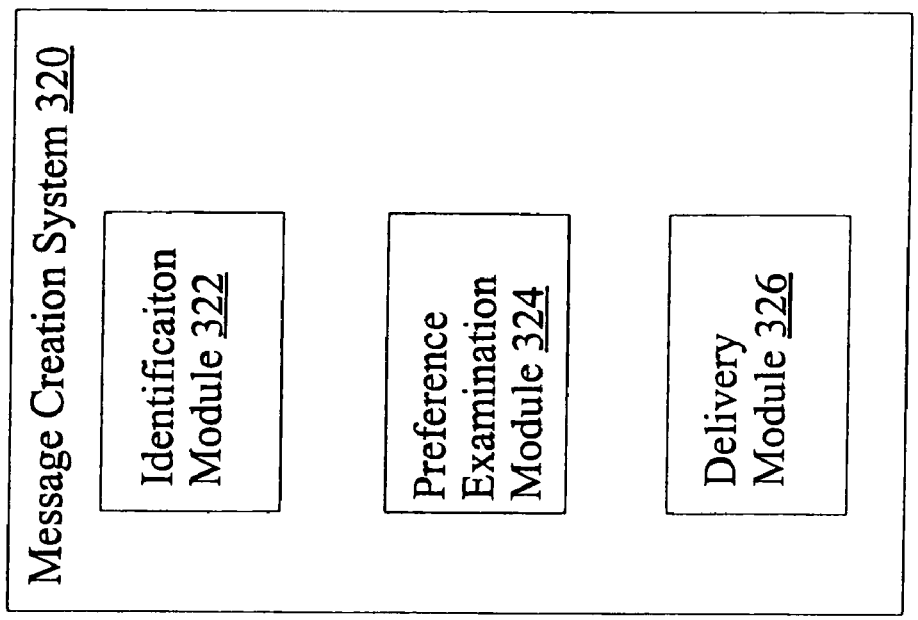
FIG. 18 is a block diagram of a message creation system.

System 10 preferably includes a message creation system 320, shown in FIG. 2, for monitoring financial activity and generating and delivering messages to users 8, 9 according to user preferences. As shown in FIG. 18, message creation system 320 includes an identification module 322, a preference examination module 324, and a delivery module 326.

In operation, identification module 322 monitors information stored in system 10 for financial activity. As used herein, "financial activity" may be any event or circumstance relative to the topics of a user 8, 9. By way of example, financial activity may include security orders and status, dividends, interest payments, expiring options, bond swaps, called bonds, maturing securities, research reevaluations, fed calls, equity calls, stock exchange calls, house calls, account balance changes, and the like. Financial activity information is preferably stored in database 20, 102-110, and, as mentioned above, financial activity relative to the financial markets is provided by market feed 21.

Identification module 324 monitors financial activity information for changes and/or activity and identifies which users 8, 9 own or have interest in those topics. By way of example, where a particular option is set to expire within the pre-determined time period, identification module 322 identifies which user(s) 8, 9 own or have an interest in that security. System 10 then transmits a signal to user preference examination module 324, which examines the preferences stored in database 110 to extract the particular preferences for each identified user. Where a user 8, 9 does not designate the expiring options preference at one of the respective preference interfaces, no message is sent to that user. Likewise, where a client user 8 designates expiring options as a preference, but not the particular account that contained the option about to expire, a message would not be sent.

When identification module 322 and preference examination module 324 indicate that a message is to be created, delivery module 326 creates the message and delivers to the appropriate users 8, 9. For instance, where a client user 8 designates expiring options as a preference and the account that contained the particular option, a message is sent via delivery module 326 to client user 8. In addition, a message may be sent to that client user's financial advisor. Actual delivery of messages may be delayed for a certain time so internal users 9 may review client user messages and utilize the system functions described herein. Delivery may also be delayed for compliance review, as described below.

When the message is sent to user 8, 9, it is sent according to the designated preferences. Specifically, the message is delivered in the designated detailed format or summary format to the appropriate electronic mailing address.

It should be remembered that although the message is described herein as being an electronic mailing message, other delivery means may exist. For example, the electronic message can be delivered via telephone, facsimile or wireless device such as a pager or a personal digital assistant (PDA), etc.

E. Compliance Review System

System 10 preferably includes a compliance review system 330, shown in FIG. 2, for determining compliance of messages with relevant regulations prior to delivery. In one setting, compliance review system 330 preferably provides a user list edit interface, similar to that shown in FIG. 10, that allows a compliance overseer internal user 9 to view and/or edit client user's assigned to receive particular messages or message topics/types. As described above, a user 8, 9 may be "tagged" for non-receipt of the message by the client user list toggle 264 (FIG. 10). In this way, compliance overseer internal users 9 can prevent transmission of information that may be inappropriate relative to legal and regulatory matters.

Of course, as one with skill in the art will recognize, compliance review system 330 may also include a robust filtering system to review messages for particular information that may be inappropriate and provide delay certain messages for further review.

F. Intervention System

System 10 also preferably includes an intervention system 340, shown in FIG. 2, for allowing an internal user 9 to intervene relative to client user 8 messages. In particular, intervening system 340 allows an internal user 9, such as a financial advisor, to add to or edit content of a message to a client user prior to delivery. Hence, an internal user 9 may add a personalized note, referred to as "touchpoint," to a client user message. For example, if an advisor wishes to send a client user an exhibit or a personal message along with a message, it would be included as a touchpoint. A "touchpoint" may also include editing of a message created by message creation system 320.

As discussed above relative to FIGS. 7-13, internal users 9 have a variety of modules available for tracking and monitoring messages sent to client users 8 prior to delivery. For instance, various internal users 9 may review client user messages as shown in FIGS. 11, 12 and 14. Each interface shown in FIGS. 7-13 includes a touchpoint selection for accessing touchpoint system 340. Upon activation of the touchpoint selection from any interface of IUI system 90, an internal user 9 may be presented with particular touchpoint interfaces according to their entitlement level as determined by security and authentication system 80. As will be described in more detail below, certain internal users 9 may be presented with different interfaces providing different functionality. For instance, some internal users may be able to create touchpoints, while others may only be able to view touchpoints.

Figure 19:
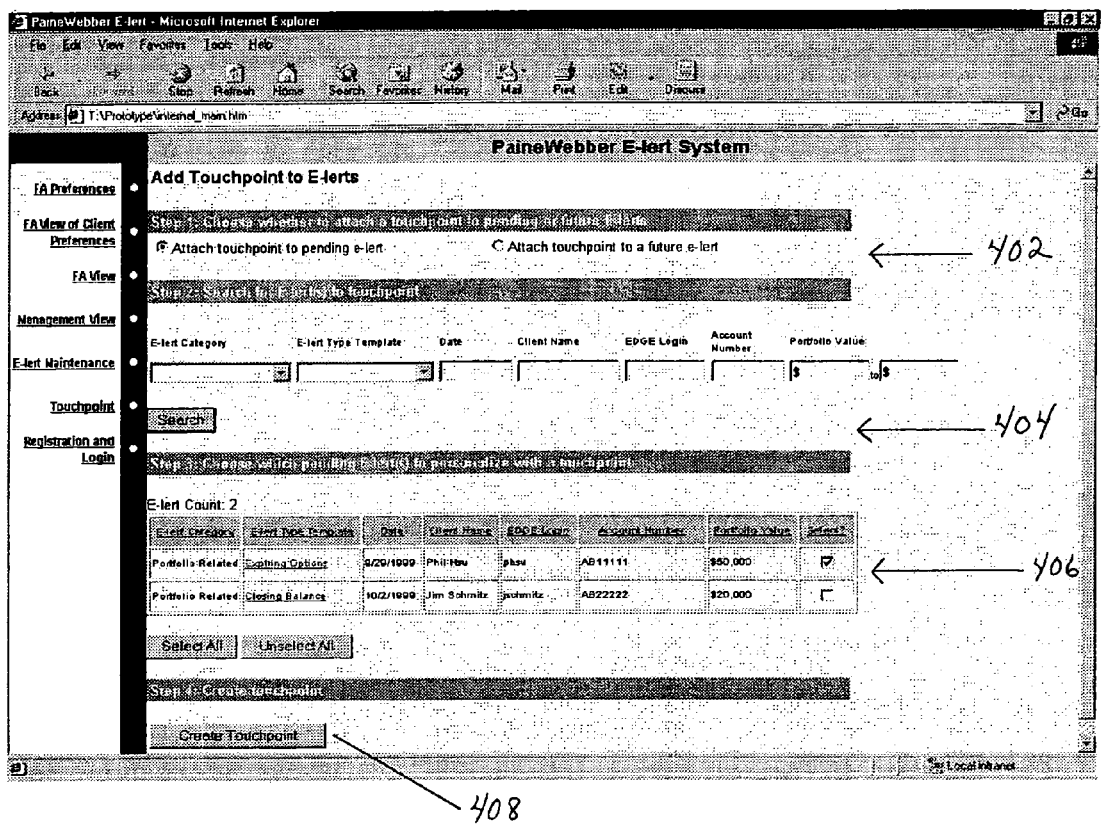
FIG. 19 illustrates an initial internal user touchpoint interface.
Figure 20:
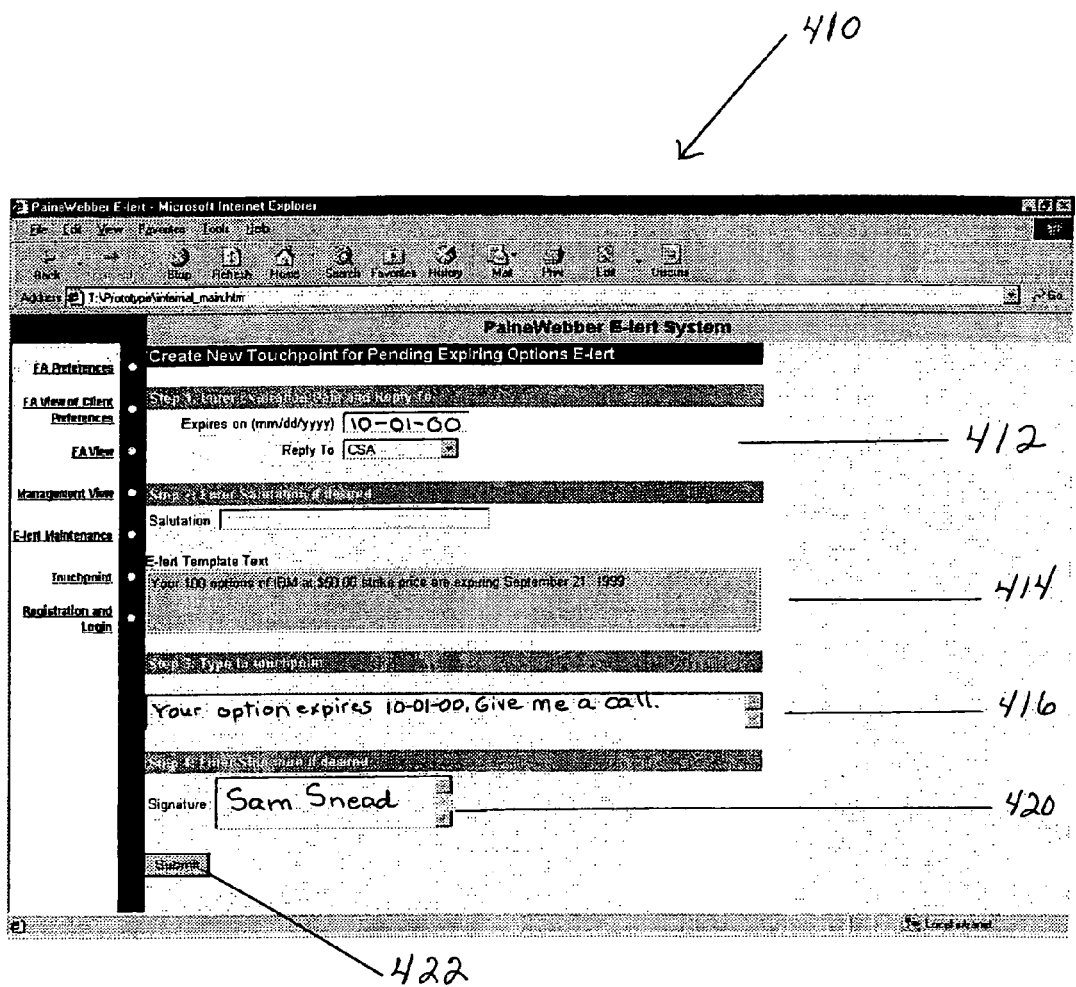
FIG. 20 illustrates a first new touchpoint entry interface.

Referring to FIG. 19, an initial internal user touchpoint interface 400 is shown. Interface 400 may be presented to any internal user 9 entitled to add touchpoints to client user 8 messages, e.g., a financial advisor, manager, CSA's, etc. At interface 400, an internal user 9 may choose between adding touchpoints to pending messages or future messages at selection 402. In addition, user 9 may search at selection 404 for messages to touchpoint by message category, message template type, client user name, login, account number, portfolio value/range, etc. Once a search is complete, user 9 is presented with a message list window 406 at which he or she may select particular client user messages or all client user messages to be touchpointed. By activating a create touchpoint selection 408, a user 9 is brought to new touchpoint entry interface 410, as shown in FIG. 20.

Preferably, interface 410 includes a heading for the type of message for which a touchpoint is to be created. For example, FIG. 20 illustrates a touchpoint created for a "pending expiring option" type message. Interface 410 may include message type specific dialogs 412, e.g., an 'Expires on' dialog for delineating time-sensitive touchpoints and a 'Reply to' dialog for indicating where a client user 8 reply should be directed. One with skill in the art will recognize that a variety of different dialogs may be provided for personalization of touchpoints. Interface 410 may also include a 'Salutation' dialog 414 for entering a salutation, e.g., "Hi Joe,"; a message template text window 416 so the user 9 can see what is already in the message, e.g., message template text, disclaimer, etc.; a touchpoint text input window 418 for entering touchpoint text, e.g., "Your option expires 10-01-00. Give me a call."; and a 'Signature' dialog 420 for entering a signature of user 9. By activating 'Submit' button 422, a touchpoint is automatically added to a message. If an internal user 9 selects more than one message for the addition of touchpoints, additional new touchpoint entry interface(s) 410 may be sequentially presented.

Figure 21:
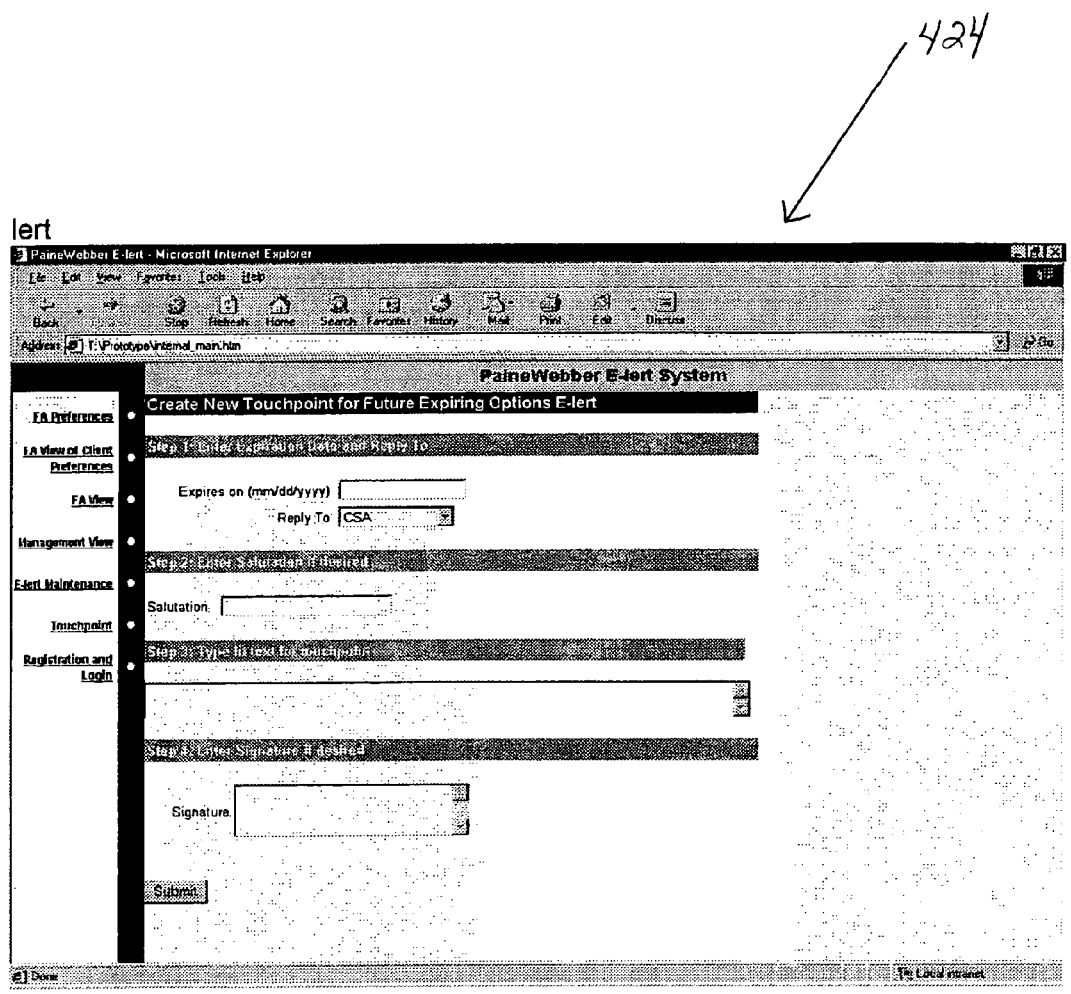
FIG. 21 illustrates a second new touchpoint entry interface.

FIG. 21 shows a new touchpoint entry interface 424 for future expiring options messages. This interface 424 is identical to interface 410, except that the message text window 416 is not provided because a message has not been created.

Figure 22:
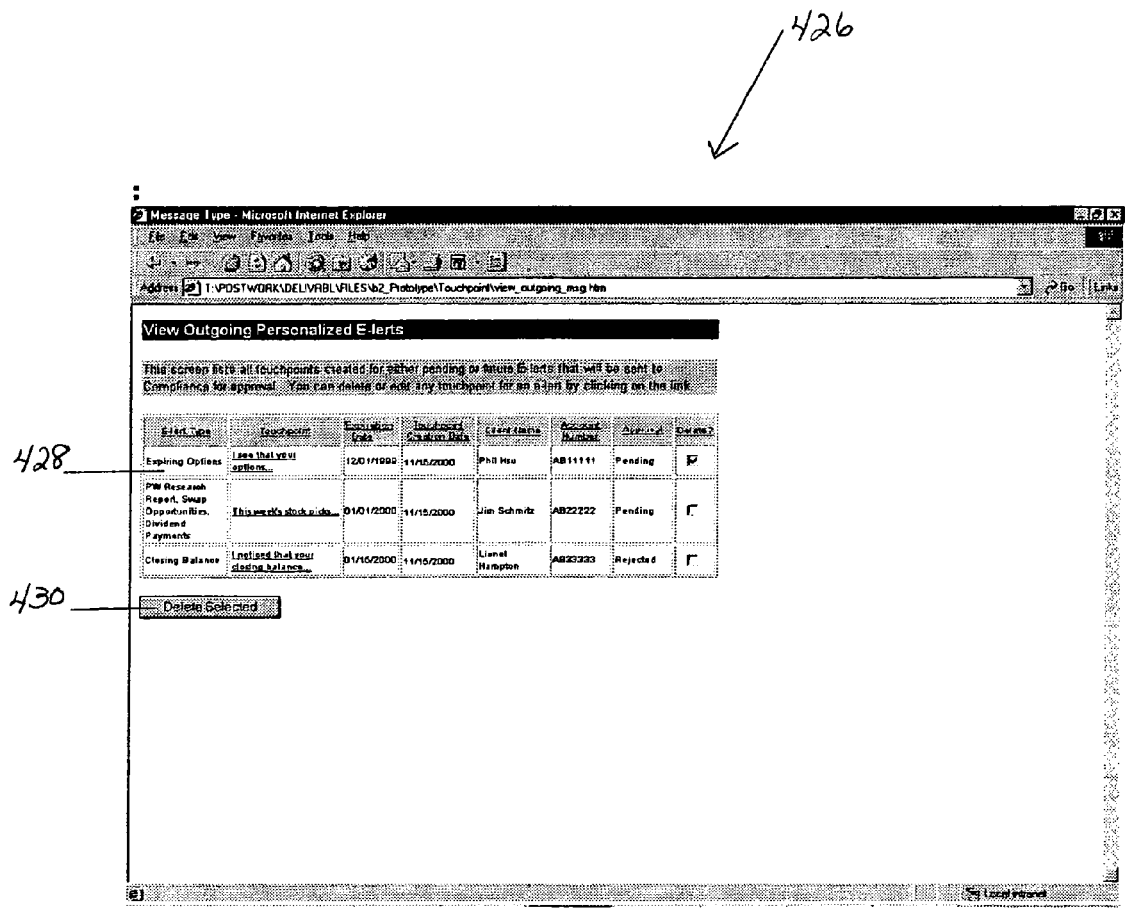
FIG. 22 illustrates a view touchpoint interface.

Referring to FIG. 22, an internal user 9 may also initiate a view touchpoint interface 426 which provides a list 428 of messages with touchpoints to be sent. List 428 may include, for example, message type, touchpoint text, expiration date, touchpoint creation date, client user name, account number, compliance approval status (e.g., pending rejected, approved, etc.), and a delete selection. By placing a check in 'Delete?' and activating 'Delete Selected' button 430, a user 9 may delete a touchpoint attached to a message. Alternatively, a user 9 may select a message for editing, e.g., by double-clicking on a message using a mouse.

Figure 23:
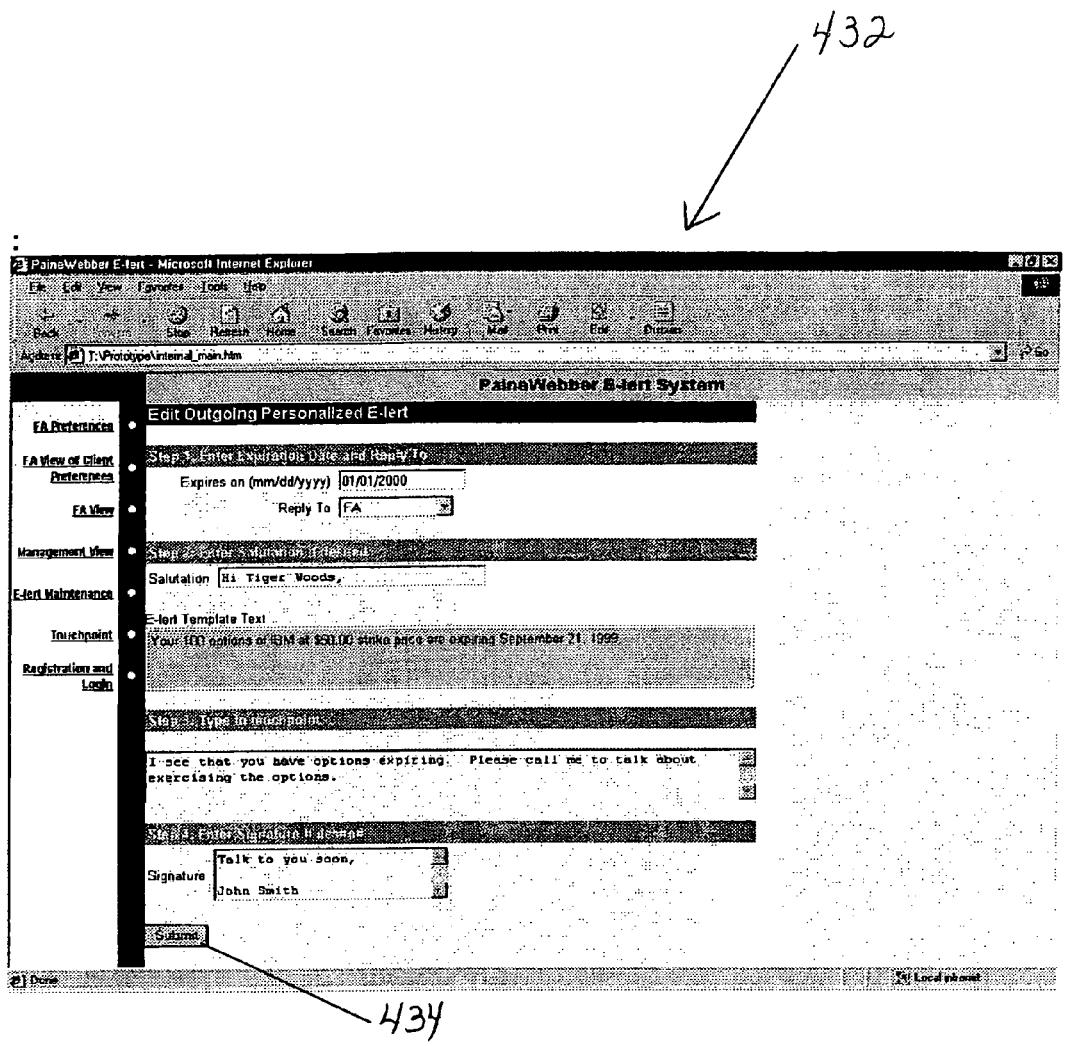
FIG. 23 illustrates a touchpoint editing interface.

A touchpoint editing interface 432 is shown in FIG. 23. Generally, editing interface 432 re-presents new touchpoint entry interface 410 and allows a user 9 to select, e.g., by pointing and clicking a mouse, the areas of the message to edit. Completion of editing is triggered by activation of 'Submit' button 434. Any number of messages may be edited by returning to view list 428 and selecting a message for editing.

Figure 24:
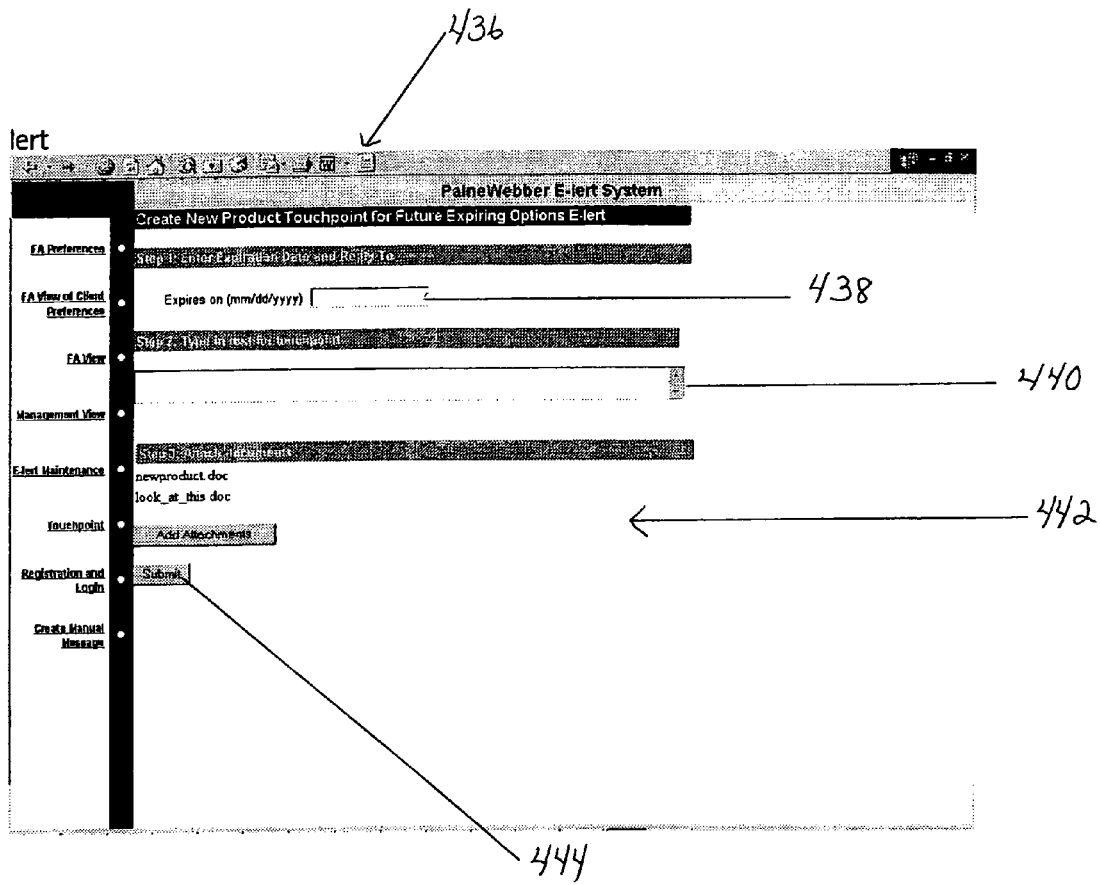
FIG. 24 illustrates a marketing agent touchpoint entry interface.
Figure 26:
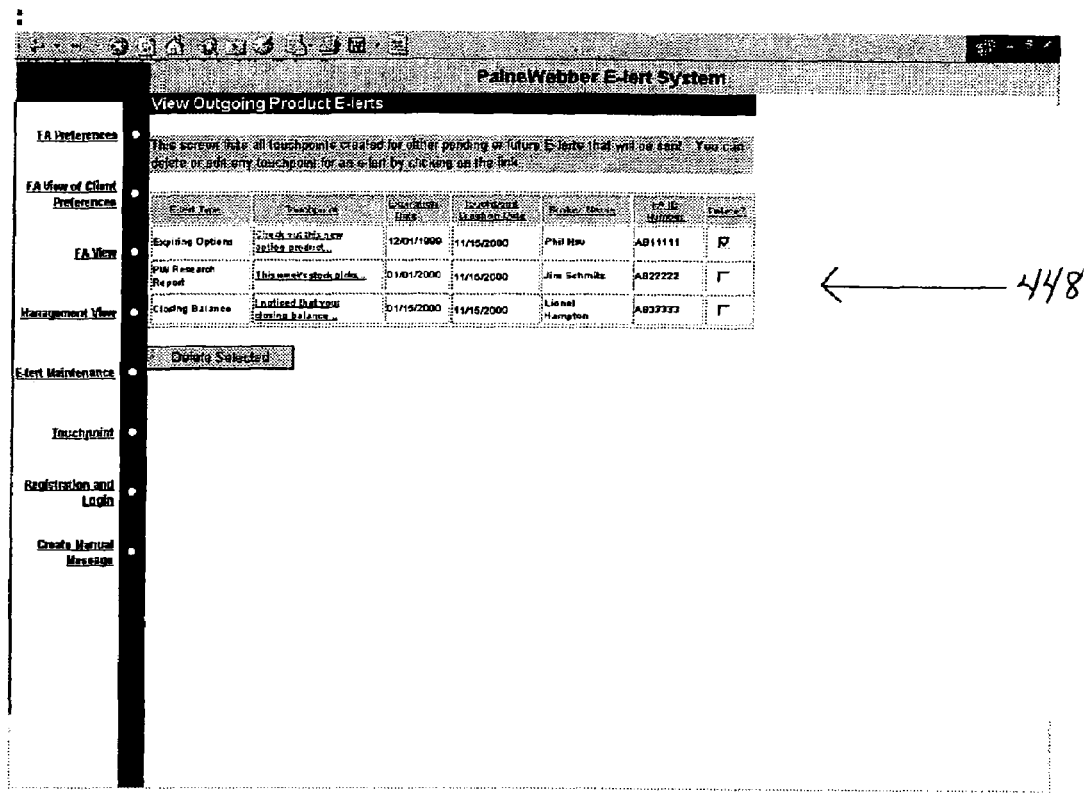
FIG. 26 illustrates a view product touchpoint interface.
Figure 27:
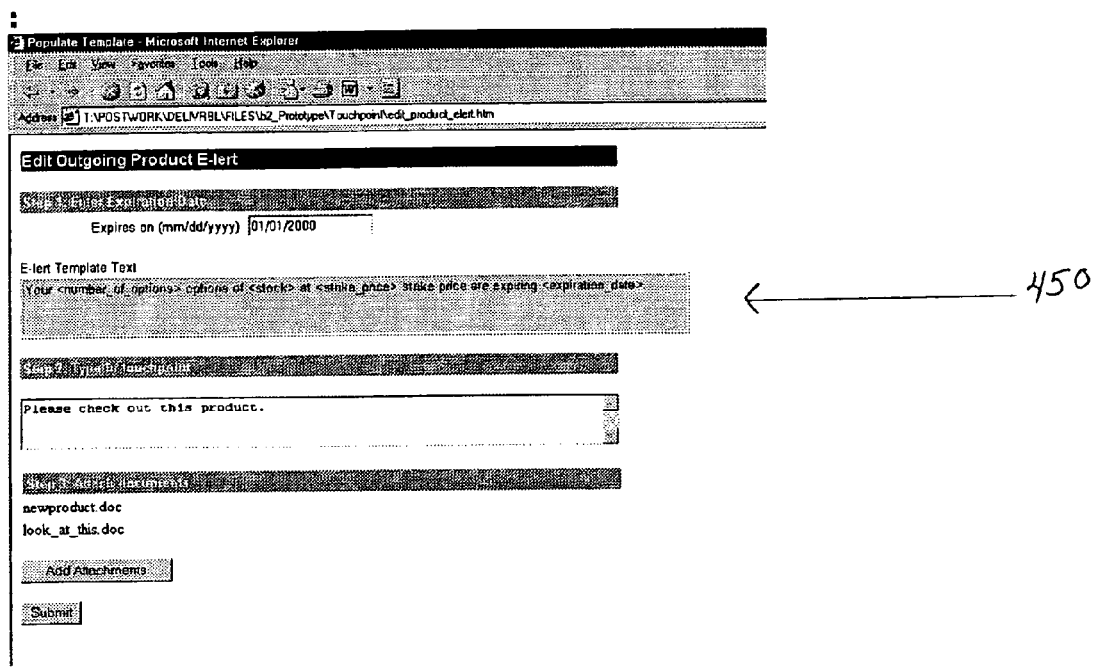
FIG. 27 illustrates an edit product touchpoint interface.
Figure 28:
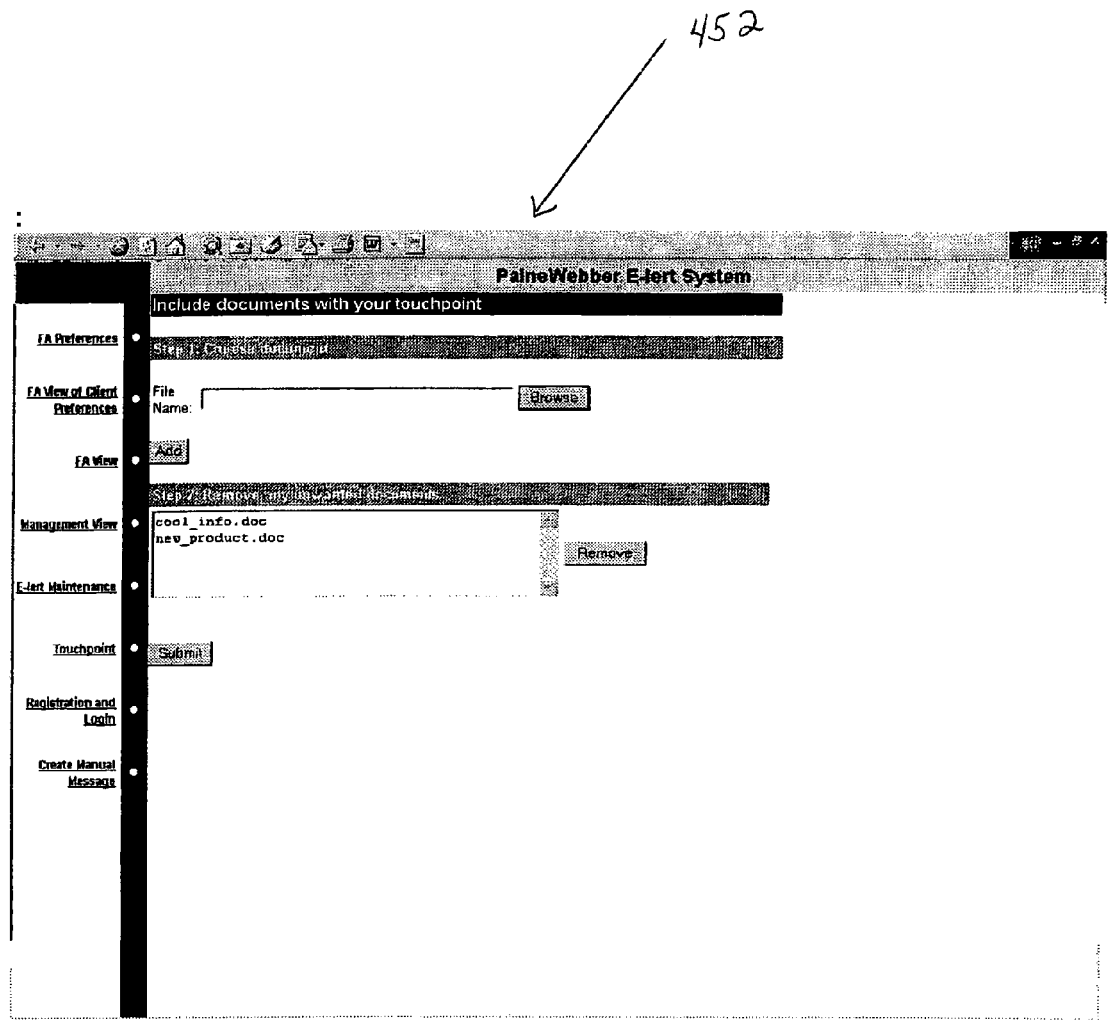
FIG. 28 illustrates a touchpoint document attachment interface.

Marketing interface module 178, shown in FIG. 6, allows marketing agents to obtain and provide information to system users. Special internal user touchpoint interfaces provided to internal users such as marketing agents are illustrated in FIGS. 24-28. FIG. 24 shows a touchpoint entry interface 436 at which a touchpoint regarding a new product having relevance to a particular type message, e.g., expiring options, can be entered. Interface 436 includes an 'Expires on' dialog 438 for delineating time-sensitive touchpoints, a touchpoint text entry window 440, an attachment selection 442 for attaching relevant documents, and a 'Submit' button 444. In this instance, a new product touchpoint would be sent with every future expiring option type message. For example, FIG. 25 shows a new product touchpoint entry interface 446 through which a marketing agent may search messages by category, template type, broker name, financial advisor identification number, wire code, etc. The marketing agent can select from the search results messages to touchpoint, similarly as described above relative to new touchpoint entry interface 410 (FIG. 19). FIGS. 26 and 27 show a view product touchpoint interface 448 and edit product touchpoint interface 450 for viewing and editing product touchpoints, respectively. Interfaces 448, 450 operate in the same manner as interfaces 426, 432 (FIGS. 22 and 23) discussed above. FIG. 28 shows a touchpoint document attachment interface 452 at which an internal user 9 may attach a document to a touchpoint message in a known fashion.

Intervention system 340 also may include mechanisms to prevent the sending of duplicative touchpoints to a particular client user 8. In addition, although not expressly shown, intervention system 340 may also include precursor selection interfaces so an internal user 9 may select whether to create new touchpoints (FIG. 19), view touchpoints (FIG. 22), edit touchpoints (FIG. 23), and the like in accordance with the procedures described above.

Accordingly, intervention system 340 provides a system for internal user(s) 9 to take a proactive approach to client user advising by providing one or more relevant personalized notes to messages that a client user 8 is scheduled to receive. In this way, internal users 9 can better monitor client user 8 information, better advise client users 8 and provide information about new products.

G. Additional Features

As shown in FIGS. 2 and 29, system 10 may also include additional features 460 such as an online chat system 462, video conferencing system 464, and webcasting system 466. On-line chat system 462 may be designated for all or select users and allows them to engage in live chat sessions. Similarly, video conferencing system 464 and webcasting system 466 can also be made available to all or selected users.

III. Messages

Figure 42:
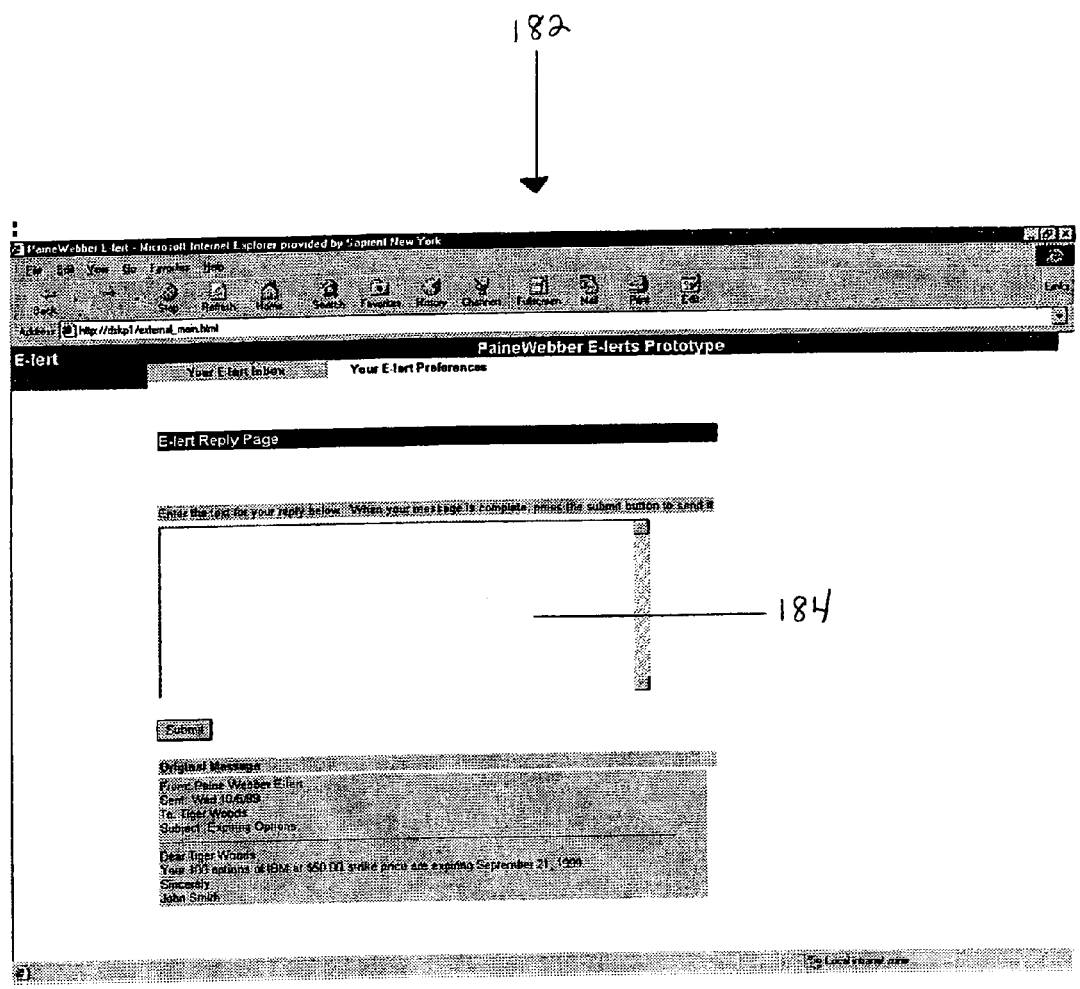
FIG. 42 illustrates a message reply window.

FIGS. 30, 31 and 33-40 illustrate messages in accordance with a first preferred embodiment of the invention. FIG. 32 illustrates a first embodiment of a client user message viewing window, or inbox, and FIGS. 41 and 42 illustrate a client inbox and a message reply window in accordance with a second preferred embodiment of the present invention. Internal user inboxes were described above relative to FIG. 11.

At the outset of the discussion of exemplary messages, it should be understood that messages may be delivered to both client users 8 and internal users 9. Accordingly, the description that follows refers to simply 'users' except where a differentiation is necessary.

Figure 31:
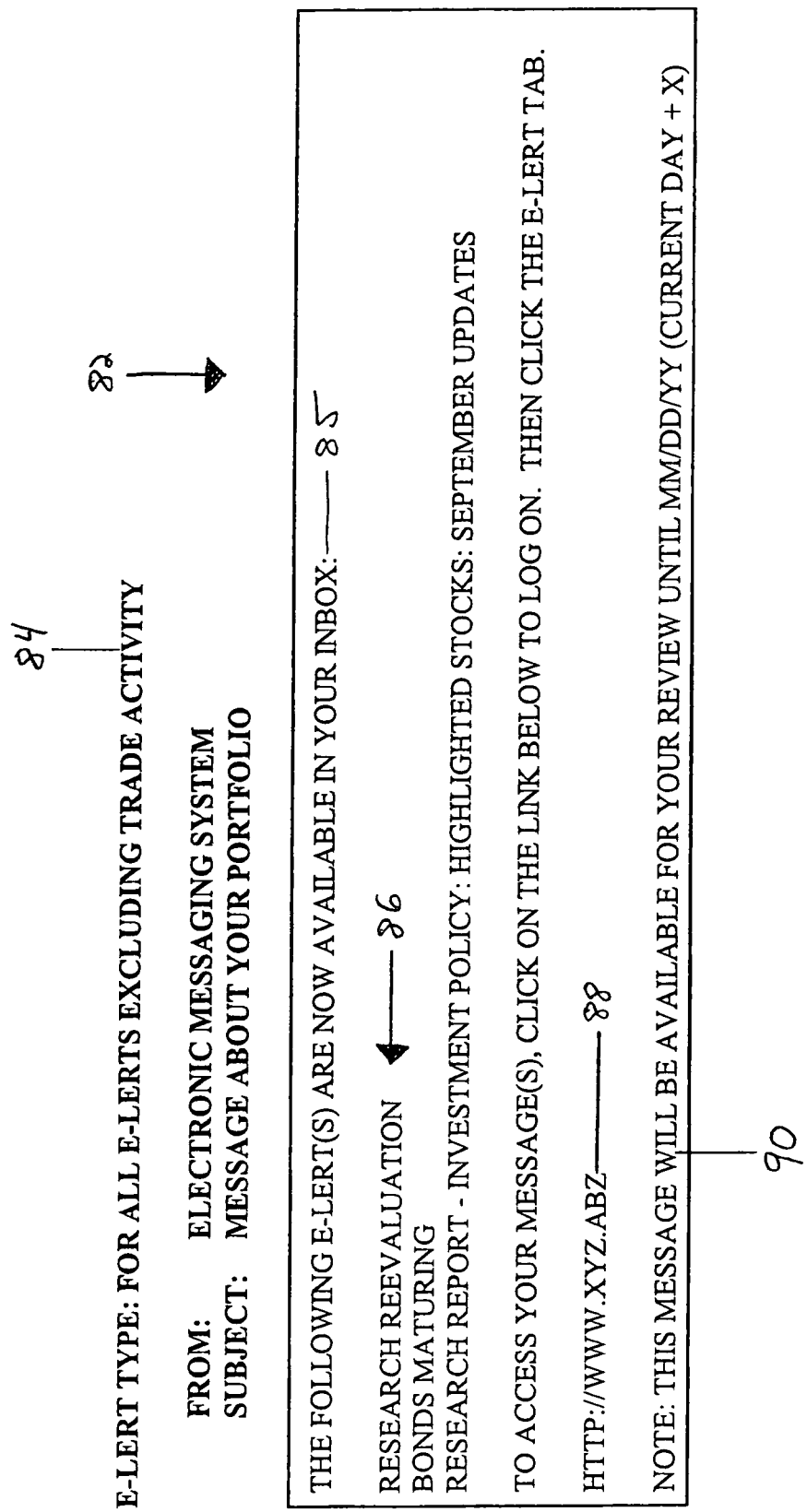
FIG. 31 illustrates a second electronic message in summary format.

FIGS. 30 and 31 illustrate an electronic message delivered to users 8, 9 in summary format. As depicted first in FIG. 30, a summary message 72 entitled Trade Activity 73 includes an indication of message topic 74 (i.e., order status 76) that is available in a users' inbox 92 shown in FIG. 32. A hypertext link 78 is also provided to give direct access to messaging system 10 for users 8. By clicking on hypertext link 78, the user can be brought either to an initial system interface or directly to the relevant inbox. Messages are stored in a client user's inbox as well as any internal user's inbox (FIG. 11), e.g., a financial advisor's inbox, or both. Textual material such as legal disclaimer 80 may also be included in the summary message 72.

FIG. 31 shows a similar summary message 82 entitled Trade Activity 84. This message includes topical indicator 85, message topics 86, hyperlink 88 and textual material 90, which indicates a message availability deadline. However, this message includes different message topics 86 than the summary message 72 of FIG. 30. Advantageously, the flexibility of system 10 provides updated messages to users in a fast, streamline and efficient manner. There is no predetermined minimum number of updates that must occur prior to the generation and delivery of a message. That is to say, a message is delivered concomitantly with topic updates. This provides users with the most current, up to date information.

FIG. 32 shows one example of inbox 92 containing updates generated and delivered by system 10. Inbox 92 preferably includes message quantity indicator 94 and a topic list 98 of the updates stored in inbox 92. To access a particular update, a user will preferably click on icon 96 adjacent thereto. Preferably, the updates are stored within inbox 94 in descending date order so that the most current update is first. It should be understood, however, that other embodiments of inbox 92 exist. For example, the updates could be stored by message and not in descending date order.

FIG. 33 lists the financial security status messages available. Referring more specifically to FIG. 34, the detailed message for research reevaluation 108 is illustrated. This attachment presents the user with a detailed description of the particular securities that received new ratings. As can be seen, the user is presented with an itemized list 113 of the securities with new ratings. In the example shown in FIG. 34, the security rating for DOW was altered downward from "attractive" to "neutral." In addition to the indication of rating change, list 113 can include other features of the security such as the full research report, closing market value, quantity, etc. as well as textual material such as legal disclaimer 115.

FIGS. 35-38 show examples of the remaining messages referenced in message list 100. Specifically, FIG. 35 shows the detailed message for expiring options 110, FIG. 36 shows the detailed message for called bonds 119, FIG. 37 shows the detailed message for maturing securities 117 and FIG. 38 shows the detailed message for trading alerts 121. The descriptions in FIGS. 35-38 provide the user with all relevant and updated information. For example, the description in FIG. 35 indicates that the CIK options in a user's portfolio are due to expire in the next two weeks. The message also provides the user with additional information relating to the security (e.g., quantity, expiration date, strike price, etc.).

Similarly, the description of FIG. 36 provides that the B44YY6 bond in a user's portfolio will be called within the next two weeks. The description of FIG. 37 provides that the E37 KV0 bond in the user's portfolio will be maturing in the next two weeks. FIG. 38 describes that an order to sell 500 shares of AOL at market price in user's account no. AB 22343 has been placed and assigned order number AB 1000. As indicated, each description can also provide a user with additional details about the securities (e.g., S&P rate, interest rate, textual material, etc.).

FIGS. 39 and 40 describe order status 121 descriptions. In particular, message 122 contains information explaining the possible outcomes of order status. As depicted, message 122 includes a description/list of possible outcomes 124, definitions 126, delivery criteria 128 for the message, a summary of the order status 130 and a detailed description of the order status 132. For example, if a client user's order status is "open," the definition 126 pertaining thereto is given as "a buy or sell that has not been executed," and the message is scheduled for immediate delivery. Likewise, detailed description 132 indicates that the order to sell 500 shares of AOL at market day in account no. AD 22343 has been placed and assigned order no. AB 1000 (as indicated in detailed message 120). As is known to those of ordinary skill in the art, the status of an order can be executed, partially executed or cancelled. It should be understood that the message of FIGS. 39 and 40 need not be delivered with each order status message; instead, the message 122 may be delivered upon request by a user, delivered periodically, or accessible through the user's inbox in a manner similar to the summary messages.

FIG. 41 shows a client user message viewing window or inbox 164 in accordance with a second embodiment. Here, the user can read old messages and/or the details of messages received in summary or generic format. In this instance, inbox 164 includes message status indicator 166 advising the user if the message is read or unread; date indicator 168 indicating the date the message was sent and/or received; account number indicator 170 indicating the client user account to which the financial message pertains; subject indicator 172 specifying the message type; message summary 174 briefly indicating the contents of the message; delete function 176 allowing the user to delete any messages; and reply buttons 180 allowing the user to reply to a message. In the event a client user 8 elects to reply to the message, a user message reply window 182, shown in FIG. 42, having an area 184 in which to type comments is provided. The reply can be routed to a specified user as denoted in 'Reply to' dialogs, discussed above relative to FIGS. 17, 20, 21, 23. For instance, a reply may be sent to the user's advisor. Replies can be used to communicate with internal users for customer service purposes, or any other purpose not listed herein.

IV. Method

Figure 43:
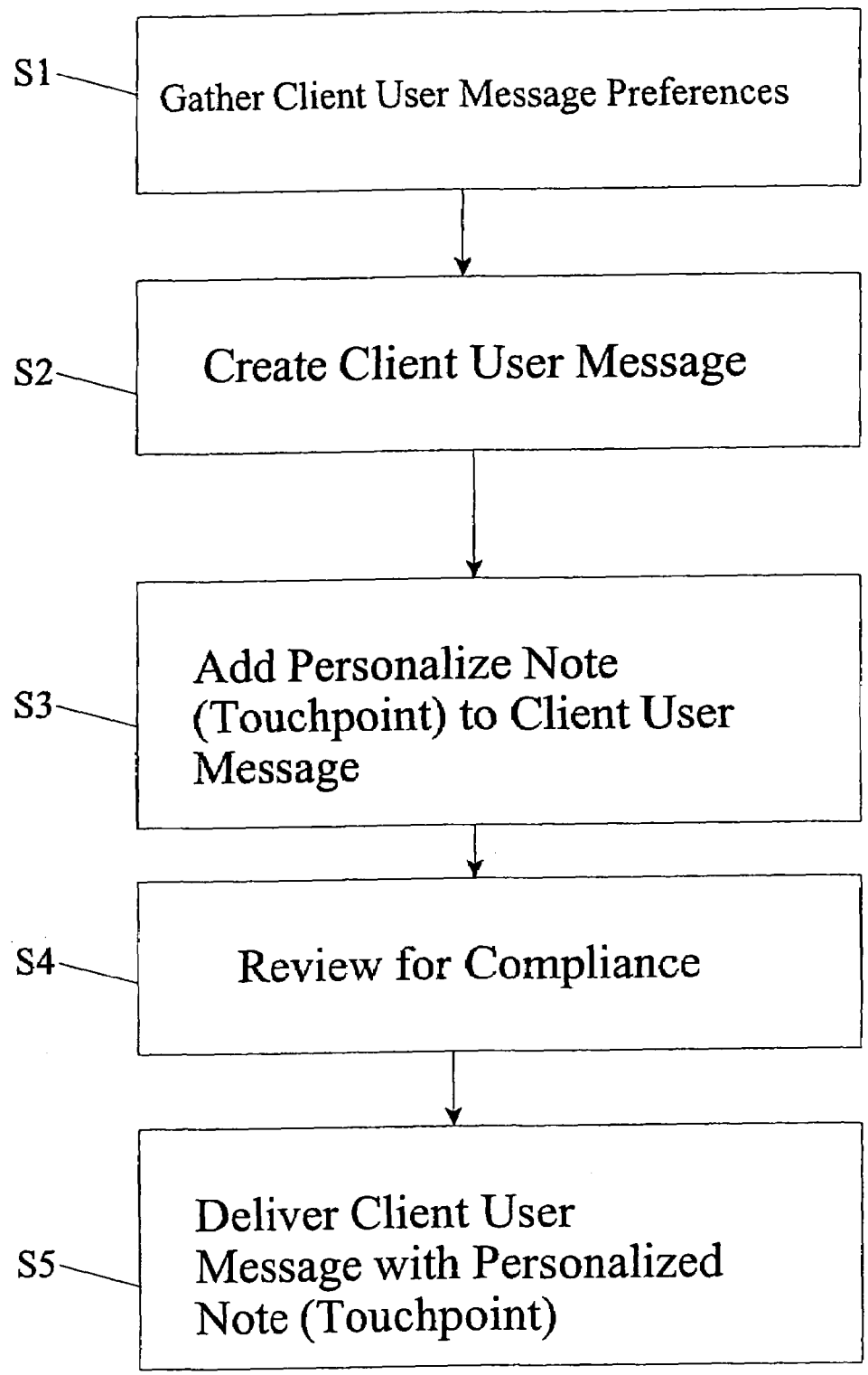
FIG. 43 is a flowchart of a method for delivering a financial message to a client user in accordance with the invention.

Referring to FIG. 43, a flowchart of a method for delivering a financial message to a client user in accordance with the invention is shown. At step S1, client user message preferences are gathered from the client user using, for example, registration system 30 as described above. Of course, client user message preferences may also be obtained in other manners such as manual questioning. The step of gathering client user message preferences may also include an internal user 9 designation of client user 8 message preferences, as described above.

At step S2, a client user message is created in accordance with the client user message preferences. This step may be provided, for example, by a message creation system 320, as discussed above. Preferably, this step includes monitoring of financial activity and preparation of a client user message regarding the financial activity.

At step S3, a personalized note, or touchpoint, from an internal user 9 may be added to a client user 8 message prior to delivery. This step is provided by intervention system 340, as described above.

At step S4, an optional review of messages prior to delivery for compliance with regulations may be provided. This step may be provided, as explained above, by compliance review system 330

At step S5, the financial message is delivered with the personalized note to the client user.

Having thus described the invention in rather full detail, it will be understood that such detail need not be strictly adhered to but that various changes, modifications may suggest themselves to one skilled in the art, all falling within the scope of the present invention as defined by the subjoined claims.

What is claimed is:

1. A computer system that delivers financial messages to individual clients comprising:
   a processor and memory;
   the memory storing a messaging system that further comprises a registration system module, a message creation system module and an intervention system module;
   the processor executing the registration system module that registers in the memory user preferences that determine financial messages to deliver to individual clients;
   the processor executing the message creation system module that automatically creates financial messages in accordance with the registered user preferences for the individual clients and delivers the automatically created financial messages to the individual clients after a predetermined delay;

the processor executing the intervention system module that, during the delay, generates a user interface through which to present at least one financial message from among the automatically generated financial messages, receives user commands input through the user interface to modify the at least one financial message, and modifies content of the at least one financial message according the user commands, resulting in a modified financial message that is delivered to the individual client by the processor executing the message creation system module.

2. The system of claim 1, wherein said intervention system module modifies the content of the at least one financial message by adding a touchpoint to the at least one financial message during the delay, the touchpoint being a personalized message to the individual client.

3. The system of claim 1, further comprising a financial adviser interface module stored in the memory, the processor executing the financial adviser interface module that presents the registered user preferences for the individual clients through a user interface, receives user commands input through the user interface, and modifies the registered user preferences of the individual clients according to the user commands.

4. The system of claim 3, wherein the user commands that modify the registered user preferences comprise at least one of editing the registered user preferences of the individual clients and designating additional user preferences to register for the individual clients.

5. The system of claim 1, wherein the registration system module comprises a registration interface module stored in the memory, the processor executing the registration interface module that presents a user interface through which the user preferences that determine the financial message to deliver to the individual clients are designated.

6. The system of claim 1, wherein the system is accessed by the individual clients from an online financial transaction forum.

7. The system of claim 1, further comprising a financial adviser interface module stored in the memory, the processor executing a financial advisor interface module that presents an advisor client user preference designation interface through which user preferences are designated for the individual clients, an advisor preference interface through which advisor message preferences are designated, and an advisor message inbox through which messages received from the individual clients and advisors are viewed.

8. The system as recited by claim 1, wherein the financial messages are delivered by electronic mail, facsimile, telephone, or wireless device.

9. A computer system that delivers financial messages to individual clients comprising:

a processor and memory;

the memory storing a messaging system that further comprises a message creation system module and an intervention system module;

the processor executing the message creation system module that automatically creates financial messages and delivers the automatically created financial messages to the individual clients after a predetermined delay;

the processor executing the intervention system module that, during the delay, generates a user interface through which to present at least one financial message from among the automatically generated financial messages, receives user commands input through the user interface to modify the at least one financial message, and modifies content of the at least one financial message according to the user commands, resulting in a modified financial message that is delivered to the individual client by the processor executing the message creation system module.

10. The system of claim 9, wherein said intervention system module modifies the content of the at least one financial message by adding a touchpoint to the at least one financial message during the delay, the touchpoint being a personalized message to the individual client.

11. The system of claim 9, further comprising a financial adviser interface module stored in the memory, the processor executing the financial adviser interface module that presents the registered user preferences for the individual clients through a user interface, receives user commands input through the user interface and modifies the registered user preferences of the individual clients according to the user commands, the user commands comprising at least one of editing the registered user preferences of the individual clients and designating additional user preferences to register for the individual clients.

12. A computerized method for delivering financial messages to individual clients comprising:

automatically creating financial messages by a computer for delivery to the individual clients;

delaying delivery of at least one of the financial messages to an individual client by the computer; and during the delay, generating a user interface by the computer through which to present the at least one financial message from among the automatically generated financial messages; receiving user commands by the computer input through the user interface to modify the at least one financial message; and modifying content of the at least one financial message by the computer according to the user commands, resulting in a modified financial message; and delivering the modified financial message by the computer to the individual client.

13. The method of claim 12, further comprising, during the delay, presenting the at least one financial message by the computer through the user interface to add a touchpoint to the at least one financial message, the touchpoint being a personalized message to the individual client.

14. The method of claim 12, further comprising:

presenting the registered user preferences for the individual clients by the computer through a user interface; and receiving user commands by the computer input through the user interface;

modifying the registered user preferences for the individual clients by the computer according to the user commands.

15. The method of claim 14, wherein the user commands that modify the registered user preferences comprise at least one of editing the registered user preferences of the individual clients and designating additional user preferences to register for the individual clients.

* * * * *